United States Patent
Marr et al.

(10) Patent No.: US 10,376,781 B2
(45) Date of Patent: Aug. 13, 2019

(54) SYSTEM AND METHOD OF GENERATING AND DISTRIBUTING VIDEO GAME STREAMS

(71) Applicant: ACTIVISION PUBLISHING, INC., Santa Monica, CA (US)

(72) Inventors: Michael D. Marr, Monroe, WA (US); Keith S. Kaplan, Bothell, WA (US)

(73) Assignee: ACTIVISION PUBLISHING, INC., Santa Monica, CA (US)

( * ) Notice: Subject to any disclaimer, the term of this patent is extended or adjusted under 35 U.S.C. 154(b) by 536 days.

(21) Appl. No.: 14/919,358

(22) Filed: Oct. 21, 2015

(65) Prior Publication Data
US 2017/0113135 A1    Apr. 27, 2017

(51) Int. Cl.
*A63F 13/335* (2014.01)
*H04L 29/06* (2006.01)
*A63F 13/32* (2014.01)

(52) U.S. Cl.
CPC ............ *A63F 13/335* (2014.09); *A63F 13/32* (2014.09); *H04L 65/1089* (2013.01); *H04L 65/4076* (2013.01); *H04L 65/602* (2013.01); *H04L 67/38* (2013.01)

(58) Field of Classification Search
None
See application file for complete search history.

(56) References Cited

U.S. PATENT DOCUMENTS

| | | | |
|---|---|---|---|
| 5,031,089 A | 7/1991 | Liu | |
| 5,442,569 A | 8/1995 | Osano | |
| 5,530,796 A | 6/1996 | Wang | |
| 5,535,276 A | 7/1996 | Ganesan | |
| 5,539,883 A | 7/1996 | Allon | |
| 5,561,736 A | 10/1996 | Moore | |
| 5,563,946 A | 10/1996 | Cooper | |
| 5,630,129 A | 5/1997 | Wheat | |
| 5,685,775 A | 11/1997 | Bakoglu | |

(Continued)

FOREIGN PATENT DOCUMENTS

| | | |
|---|---|---|
| AU | 768367 | 3/2004 |
| AU | 2005215048 | 10/2011 |

(Continued)

OTHER PUBLICATIONS

Office Action dated Jun. 26, 2014 for U.S. Appl. No. 13/731,661.

(Continued)

*Primary Examiner* — Robert T Clarke, Jr.
(74) *Attorney, Agent, or Firm* — Novel IP

(57) ABSTRACT

A system and method is provided that generates a game log that specifies game events during gameplay to enable efficient distribution of video game playback, facilitates the annotation of gameplay through content from users and others, and generates a video game stream that includes the game log and content. The system facilitates the efficient sharing of video game playback, as well as annotations from users and others. For example, e-sportscasters may use the system to broadcast video game playback with their commentary and/or graphical overlays. Video game players may use the system to share video game playback efficiently with other users. The system may also facilitate the sharing of loadout conditions and micro-transactions relevant to video game playback.

15 Claims, 10 Drawing Sheets

(56) References Cited

U.S. PATENT DOCUMENTS

| | | |
|---|---|---|
| 5,706,507 A | 1/1998 | Schloss |
| 5,708,764 A | 1/1998 | Borrel |
| 5,736,985 A | 4/1998 | Lection |
| 5,736,990 A | 4/1998 | Barrus |
| 5,737,416 A | 4/1998 | Cooper |
| 5,745,678 A | 4/1998 | Herzberg |
| 5,762,552 A | 6/1998 | Vuong |
| 5,768,511 A | 6/1998 | Galvin |
| 5,774,668 A | 6/1998 | Choquier |
| 5,796,393 A | 8/1998 | MacNaughton |
| 5,825,877 A | 10/1998 | Dan |
| 5,835,692 A | 11/1998 | Cragun |
| 5,860,137 A | 1/1999 | Raz |
| 5,875,296 A | 2/1999 | Shi |
| 5,878,233 A | 3/1999 | Schloss |
| 5,883,628 A | 3/1999 | Mullaly |
| 5,884,024 A | 3/1999 | Lim |
| 5,900,879 A | 5/1999 | Berry |
| 5,903,266 A | 5/1999 | Berstis |
| 5,903,271 A | 5/1999 | Bardon |
| 5,908,469 A | 6/1999 | Botz |
| 5,911,045 A | 6/1999 | Leyba |
| 5,920,325 A | 7/1999 | Morgan |
| 5,923,324 A | 7/1999 | Berry |
| 5,938,722 A | 8/1999 | Johnson |
| 5,944,824 A | 8/1999 | He |
| 5,963,915 A | 10/1999 | Kirsch |
| 5,969,724 A | 10/1999 | Berry |
| 5,977,979 A | 11/1999 | Clough |
| 5,990,888 A | 11/1999 | Blades |
| 6,008,848 A | 12/1999 | Tiwari |
| 6,009,455 A | 12/1999 | Doyle |
| 6,014,145 A | 1/2000 | Bardon |
| 6,021,268 A | 2/2000 | Johnson |
| 6,025,839 A | 2/2000 | Schell |
| 6,049,819 A | 4/2000 | Buckle |
| 6,058,266 A | 5/2000 | Megiddo |
| 6,059,842 A | 5/2000 | Dumarot |
| 6,069,632 A | 5/2000 | Mullaly |
| 6,081,270 A | 6/2000 | Berry |
| 6,081,271 A | 6/2000 | Bardon |
| 6,088,727 A | 7/2000 | Hosokawa |
| 6,091,410 A | 7/2000 | Lection |
| 6,094,196 A | 7/2000 | Berry |
| 6,098,056 A | 8/2000 | Rusnak |
| 6,101,538 A | 8/2000 | Brown |
| 6,104,406 A | 8/2000 | Berry |
| 6,111,581 A | 8/2000 | Berry |
| 6,134,588 A | 10/2000 | Guenthner |
| 6,141,699 A | 10/2000 | Luzzi |
| 6,144,381 A | 11/2000 | Lection |
| 6,148,328 A | 11/2000 | Cuomo |
| 6,179,713 B1 | 1/2001 | James |
| 6,185,614 B1 | 2/2001 | Cuomo |
| 6,201,881 B1 | 3/2001 | Masuda |
| 6,222,551 B1 | 4/2001 | Schneider |
| 6,271,842 B1 | 8/2001 | Bardon |
| 6,271,843 B1 | 8/2001 | Lection |
| 6,282,547 B1 | 8/2001 | Hirsch |
| 6,308,208 B1 | 10/2001 | Jung |
| 6,311,206 B1 | 10/2001 | Malkin |
| 6,314,465 B1 | 11/2001 | Paul |
| 6,330,281 B1 | 12/2001 | Mann |
| 6,334,141 B1 | 12/2001 | Varma |
| 6,336,134 B1 | 1/2002 | Varma |
| 6,337,700 B1 | 1/2002 | Kinoe |
| 6,345,287 B1 | 2/2002 | Fong |
| 6,349,091 B1 | 2/2002 | Li |
| 6,351,775 B1 | 2/2002 | Yu |
| 6,353,449 B1 | 3/2002 | Gregg |
| 6,356,297 B1 | 3/2002 | Cheng |
| 6,370,560 B1 | 4/2002 | Robertazzi |
| 6,393,467 B1 | 5/2002 | Potvin |
| 6,411,312 B1 | 6/2002 | Sheppard |
| 6,418,462 B1 | 7/2002 | Xu |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,466,550 B1 | 10/2002 | Foster |
| 6,469,712 B1 | 10/2002 | Hilpert, Jr. |
| 6,473,085 B1 | 10/2002 | Brock |
| 6,473,597 B1 | 10/2002 | Johnson |
| 6,499,053 B1 | 12/2002 | Marquette |
| 6,505,208 B1 | 1/2003 | Kanevsky |
| 6,509,925 B1 | 1/2003 | Dermler |
| 6,525,731 B1 | 2/2003 | Suits |
| 6,539,415 B1 | 3/2003 | Mercs |
| 6,549,933 B1 | 4/2003 | Barrett |
| 6,567,109 B1 | 5/2003 | Todd |
| 6,567,813 B1 | 5/2003 | Zhu |
| 6,574,477 B1 | 6/2003 | Rathunde |
| 6,580,981 B1 | 6/2003 | Masood |
| 6,601,084 B1 | 7/2003 | Bhaskaran |
| 6,618,751 B1 | 9/2003 | Challenger |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,699,127 B1 | 3/2004 | Lobb |
| 6,717,600 B2 | 4/2004 | Dutta |
| 6,734,884 B1 | 5/2004 | Berry |
| 6,765,596 B2 | 7/2004 | Lection |
| 6,781,607 B1 | 8/2004 | Benham |
| 6,801,930 B1 | 10/2004 | Dionne |
| 6,819,669 B2 | 11/2004 | Rooney |
| 6,832,239 B1 | 12/2004 | Kraft |
| 6,836,480 B2 | 12/2004 | Basso |
| 6,845,389 B1 | 1/2005 | Sen |
| 6,886,026 B1 | 4/2005 | Hanson |
| 6,941,236 B2 | 9/2005 | Huelsbergen |
| 6,948,168 B1 | 9/2005 | Kuprionas |
| RE38,865 E | 11/2005 | Dumarot |
| 6,970,929 B2 | 11/2005 | Bae |
| 6,993,596 B2 | 1/2006 | Hinton |
| 7,006,616 B1 | 2/2006 | Christofferson |
| 7,028,296 B2 | 4/2006 | Irfan |
| 7,062,533 B2 | 6/2006 | Brown |
| 7,089,266 B2 | 8/2006 | Stolte |
| 7,124,071 B2 | 10/2006 | Rich |
| 7,139,792 B1 | 11/2006 | Mishra |
| 7,143,409 B2 | 11/2006 | Herrero |
| 7,159,217 B2 | 1/2007 | Pulsipher |
| 7,185,067 B1 | 2/2007 | Viswanath |
| 7,209,137 B2 | 4/2007 | Brokenshire |
| 7,230,616 B2 | 6/2007 | Taubin |
| 7,249,123 B2 | 7/2007 | Elder |
| 7,263,511 B2 | 8/2007 | Bodin |
| 7,287,053 B2 | 10/2007 | Bodin |
| 7,305,438 B2 | 12/2007 | Christensen |
| 7,308,476 B2 | 12/2007 | Mannaru |
| 7,353,295 B1 | 4/2008 | Crow |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,180 B2 | 12/2008 | Kaufman |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,515,136 B1 | 4/2009 | Kanevsky |
| 7,525,964 B2 | 4/2009 | Astley |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |

(56) References Cited

U.S. PATENT DOCUMENTS

| | | |
|---|---|---|
| 7,580,888 B2 | 8/2009 | Ur |
| 7,590,984 B2 | 9/2009 | Kaufman |
| 7,596,596 B2 | 9/2009 | Chen |
| 7,640,587 B2 | 12/2009 | Fox |
| 7,667,701 B2 | 2/2010 | Leah |
| 7,698,656 B2 | 4/2010 | Srivastava |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,773,087 B2 | 8/2010 | Fowler |
| 7,774,407 B2 | 8/2010 | Daly |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,847,799 B2 | 12/2010 | Taubin |
| 7,856,469 B2 | 12/2010 | Chen |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | Finn |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,550,920 B1 | 10/2013 | Allen |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,005,030 B2 | 4/2015 | Laakkonen |

(56) References Cited

U.S. PATENT DOCUMENTS

| | | |
|---|---|---|
| 9,005,036 B2 | 4/2015 | Laakkonen |
| 9,083,654 B2 | 7/2015 | Dawson |
| 9,152,914 B2 | 10/2015 | Haggar |
| 9,199,165 B2 | 12/2015 | Zahn |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,403,090 B2 | 8/2016 | Harris |
| 9,474,973 B2 | 10/2016 | Perry |
| 9,525,746 B2 | 12/2016 | Bates |
| 9,583,109 B2 | 2/2017 | Kurata |
| 9,621,622 B2 | 4/2017 | Ueda |
| 9,630,097 B2 | 4/2017 | Paradise |
| 9,641,592 B2 | 5/2017 | Thompson |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 2002/0007317 A1 | 1/2002 | Callaghan |
| 2002/0010776 A1 | 1/2002 | Lerner |
| 2002/0023159 A1 | 2/2002 | Vange |
| 2002/0056006 A1 | 5/2002 | Vange |
| 2002/0065870 A1 | 5/2002 | Baehr-Jones |
| 2002/0078192 A1 | 6/2002 | Kopsell |
| 2002/0107918 A1 | 8/2002 | Shaffer |
| 2002/0124137 A1 | 9/2002 | Ulrich |
| 2003/0008712 A1 | 1/2003 | Poulin |
| 2003/0037131 A1 | 2/2003 | Verma |
| 2003/0055892 A1 | 3/2003 | Huitema |
| 2003/0056002 A1 | 3/2003 | Trethewey |
| 2003/0084172 A1 | 5/2003 | Dejong |
| 2003/0084302 A1 | 5/2003 | De |
| 2003/0110399 A1 | 6/2003 | Rail |
| 2003/0135621 A1 | 7/2003 | Romagnoli |
| 2003/0149781 A1 | 8/2003 | Yared |
| 2003/0163733 A1 | 8/2003 | Barriga-Caceres |
| 2003/0177187 A1 | 9/2003 | Levine |
| 2004/0014514 A1 | 1/2004 | Yacenda |
| 2004/0103079 A1 | 5/2004 | Tokusho |
| 2004/0210627 A1 | 10/2004 | Kroening |
| 2004/0228291 A1 | 11/2004 | Huslak |
| 2004/0244006 A1 | 12/2004 | Kaufman |
| 2005/0015571 A1 | 1/2005 | Kaufman |
| 2005/0246711 A1 | 11/2005 | Berstis |
| 2007/0060359 A1 | 3/2007 | Smith |
| 2008/0046956 A1 | 2/2008 | Kulas |
| 2008/0139301 A1 | 6/2008 | Holthe |
| 2008/0270605 A1 | 10/2008 | Berstis |
| 2008/0301405 A1 | 12/2008 | Kaufman |
| 2009/0113448 A1 | 4/2009 | Smith |
| 2009/0131177 A1 | 5/2009 | Pearce |
| 2009/0258708 A1 | 10/2009 | Figueroa |
| 2011/0151971 A1 | 6/2011 | Altshuler |
| 2012/0289346 A1 | 11/2012 | Van Luchene |
| 2014/0031121 A1 | 1/2014 | Kern |
| 2014/0221084 A1 | 8/2014 | Morrison, III |
| 2014/0235336 A1 | 8/2014 | Morimoto |
| 2014/0344725 A1 | 11/2014 | Bates |
| 2014/0370979 A1* | 12/2014 | Zahn .................. A63F 13/00 463/31 |
| 2015/0141140 A1 | 5/2015 | Lampe |
| 2015/0224395 A1 | 8/2015 | Trombetta |
| 2015/0224399 A1 | 8/2015 | Melo |
| 2015/0375102 A1 | 12/2015 | George |
| 2016/0171835 A1 | 6/2016 | Washington |
| 2016/0180647 A1 | 6/2016 | Webb |
| 2016/0191671 A1 | 6/2016 | Dawson |
| 2016/0214012 A1* | 7/2016 | Nishikawa ........... A63F 13/497 |
| 2017/0014718 A1 | 1/2017 | Ceraldi |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0940960 A1 | 9/1999 |
| EP | 0998091 A2 | 5/2000 |
| EP | 1020804 A2 | 7/2000 |
| EP | 0627728 B1 | 9/2000 |
| EP | 1089516 A2 | 4/2001 |
| EP | 0717337 B1 | 8/2001 |
| EP | 1207694 A2 | 5/2002 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | H1198134 A | 4/1999 |
| JP | H11191097 A | 4/1999 |
| JP | 11191097 | 7/1999 |
| JP | 3033956 B2 | 4/2000 |
| JP | 3124916 B2 | 1/2001 |
| JP | 3177221 B2 | 6/2001 |
| JP | 2001204973 A | 7/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 357915 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| KR | 20020038229 A | 5/2002 |
| KR | 20030039019 A | 5/2003 |
| MY | 117864 A | 8/2004 |
| SG | 55396 | 12/1998 |
| TW | 424213 | 3/2001 |
| TW | 527825 | 4/2003 |
| WO | 9642041 A2 | 12/1996 |
| WO | 9900960 A1 | 1/1999 |
| WO | 0203645 A2 | 1/2002 |
| WO | 2002073457 | 9/2002 |
| WO | 20020087156 | 10/2002 |
| WO | 03049459 A1 | 6/2003 |

(56) References Cited

FOREIGN PATENT DOCUMENTS

| WO | 03058518 A2 | 7/2003 |
|---|---|---|
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

OTHER PUBLICATIONS

Office Action dated Nov. 10, 2014 for U.S. Appl. No. 13/731,661.
EverQuest Wiki, "EverQuest Classes", Aug. 19, 2011, <http://everquest.wikia.com/wiki/Classes?oldid=3773>.
Applicant Initiated Interview Summary dated Feb. 10, 2015 for U.S. Appl. No. 13/731,661.
Planet Unreal, "Unreal Tournament Game Guide", game released Nov. 1999 with earliest article cmment on Sep. 6, 2007, IGN Entertainment, <http://planetunreal.gamespy.com/View.php?view=UTGameInfo.Detail&id=28&game=6><http://planetunreal.gamespy.com/View.php?view=UTGameInfo.Detail&id=1&game=6>.
Notice of Allowance dated Jul. 12, 2018 for U.S. Appl. No. 13/731,661 (pp. 1-9).
Office Action dated Aug. 8, 2018 for U.S. Appl. No. 14/561,801 (pp. 1-27).
Notice of Allowance dated Nov. 1, 2018 for U.S. Appl. No. 14/919,430 (pp. 1-14).
Notice of Allowance dated Oct. 31, 2018 for U.S. Appl. No. 15/136,386 (pp. 1-7).
Notice of Allowance dated Nov. 13, 2018 for U.S. Appl. No. 14/919,444 (pp. 1-10).
Notice of Allowance dated Jan. 14, 2019 for U.S. Appl. No. 15/136,334 (pp. 1-7).
Notice of Allowance dated Mar. 26, 2018 for U.S. Appl. No. 13/731,661 (pp. 1-8).
Office Action dated Mar. 21, 2018 for U.S. Appl. No. 14/919,430 (pp. 1-22).
Office Action dated Mar. 9, 2018 for U.S. Appl. No. 14/919,444 (pp. 1-16).
Office Action dated Oct. 6, 2017 for U.S. Appl. No. 15/136,334 (pp. 1-10).
Office Action dated Oct. 6, 2017 for U.S. Appl. No. 15/136,386 (pp. 1-9).
Office Action dated Jun. 20, 2017 for U.S. Appl. No. 14/561,801.
Office Action dated Feb. 8, 2018 for U.S. Appl. No. 14/561,801 (pp. 1-23).
Kormann et al., "Risks of the Passport Single Signon Protocol"< 9th Intl. WWW Conf., May 15, 2000.
Syverson, "Limitations on design principles for public key protocols", Proc. of 1996 IEEE Symposium on Security and Privacy, pp. 62-72, May 6, 1996.
Abadi et al., "Prudent Engineering Practice for Cryptogrphic Protocols", Proc. of 1994 IEEE Computer Society Symposium on Research in Security and Privacy, pp. 122-136, May 16, 1994.
Supplementary European Search from the European Patent Office for EP05723458.5, dated Jul. 19, 2010.
International Search Report as Published as WO2005/079538 in corresponding international application No. PCT/US2005/005550, dated Jul. 5, 2006.
Duong et al; "A dynamic load sharing algorithm for massivly multiplayer online games" published Sep. 28, 2003-Oct. 1, 2003. http://ieeexplore.ieee.org/iel5/8945/28322/01266179.pdf?tp=&arnumber-=1266179&isnumber=28322http://ieeexplore.ieee.org/xpl/absprintf.jsp?arnumb- er=1266179.
"A multi-server architecture for distributed virtual walkthrough" http://delivery.acm.org/10.1145/590000/585768/p163-ng.pdf?key1=585768&key-2=0554824911&coll=GUIDE&dI=GUIDE&CFID=41712537&CFTOKEN=50783297.
Mauve, M., Fischer, S., and Widmer, J. 2002. A generic proxy system for networked computer games. In Proceedings of the 1st Workshop on Network and System Support for Games (Braunschweig, Germany, Apr. 16-17, 2002). NetGames '02. ACM, New York, NY, 25-28. DOI= http://doi.acm.org/10.1145/566500.566504.
IBM developer Works, OptimalGrid—autonomic computing on the Grid, James H. Kaufman; Tobin J. Lehman; Glenn Deen; and John Thomas, Jun. 2003.
IBM, Transcoding: Extending e-business to new environments, Britton et al., Sep. 22, 2000.
Lee et al., "A Self-Adjusting Data Distribution Mechanism for Multidimensional Load Balancing in Multiprocessor-Based Database Systems," Information Systems vol. 19, No. 7, pp. 549-567, 1994.
Ma et al., "A Scalable Parallel Cell-Projection Volume Rendering Algorithm for Three-Dimensional Unstructured Data", IEEE 1997, pp. 1-10.
Feng et al., "A Parallel Hierarchical Radiosity Algorithm for Complex Scenes," Proceedings IEEE Symposium on Parallel Rendering (PRS) '97), IEEE Computer Society Technical Committee on Computer Graphics in cooperation with ACM SIGGRAPH pp. 71-79, 1997.
Hassen et al., "A Task- and Data-Parallel Programming Language Based on Shared Objects," ACM Transactions on Programming Languages and Systems, vol. 20, No. 6, Nov. 1998, pp. 1131-1170.
Andert, "A Simulation of Dynamic Task Allocation in a Distributed Computer System," Proceedings of the 1987 Winter Simulation Conference, 1987, pp. 1-9.
Office Action dated May 16, 2018 for U.S. Appl. No. 15/136,334 (pp. 1-12).
Office Action dated May 18, 2018 for U.S. Appl. No. 15/136,386 (pp. 1-11).

* cited by examiner

SYSTEM AND METHOD OF GENERATING AND DISTRIBUTING VIDEO GAME STREAMS

CROSS-REFERENCE TO RELATED APPLICATIONS

This application is related to the following, co-pending U.S. utility patent applications, filed on even date herewith: U.S. patent application Ser. No. 14/919,430, entitled "System and Method of Identifying Portions of Video Game Streams for Driving Microtransactions;" and U.S. patent application Ser. No. 14/919,444, entitled "System and Method of Inferring User Interest in Different Aspects of Video Game Streams;" each of which is hereby incorporated by reference herein in its entirety.

FIELD OF THE INVENTION

The invention relates to a system and method of generating a game log that specifies game events during gameplay to enable efficient distribution of video game playback, facilitating the annotation of gameplay through content from users and others, and generating a video game stream that includes the game log and content.

BACKGROUND OF THE INVENTION

Electronic sports ("e-sports"), also known as competitive video gaming, has grown in popularity due in large part to the explosive growth of online video games and availability of network connectivity. Along with the popularity of e-sports, demand for live streaming or pre-stored replays of video gameplay sessions has grown. Although storage and network technology has advanced in recent years to accommodate large scale data storage and transferring, the load on storage and network infrastructure imposed by live streaming and pre-stored playback of video gameplay sessions can be quite large, potentially causing delays and dissatisfaction for end users and maintenance problems for system administrators. This is because conventional methods of providing such playback typically involves recording gameplay as media files. These media files become very large, thanks in large part to modern high definition, graphics-intense, video games.

Furthermore, even casual gamers are increasingly sharing their gameplay through social networks. Again, such sharing is typically performed by recording gameplay as a media file. A further limitation of conventional systems is the limited manner in which users can provide commentary on other users' gameplay, search for video game playback and commentary, and obtain localized content relating to video game playback.

These and other problems exist with annotating and sharing video game playback.

SUMMARY OF THE INVENTION

The invention addressing these and other drawbacks relates to a system and method of generating a game log that specifies game events during gameplay to enable efficient distribution of video game playback, facilitating the content editing and annotation of gameplay through content from users and others, and generating a video game stream that includes the game log and additional content.

The system may be used by users in various ways. For example, e-sportscasters may use the system to broadcast video game playback (whether in real-time or otherwise) along with their commentary, graphical overlays, and/or other content. Such broadcasts may be provided to viewers through conventional media file formats (or television broadcast) or through video game streams that are decoded (e.g., by a game engine that created a game log from the video game stream) at the viewers' end user devices. Video game players may use the system to share video game playback and their commentary and/or other content. Viewers may search the system for players of interest, commentators of interest, and/or other search criteria.

The system may use a game log as a compact vehicle to share playback of gameplay through a network. A game log, which may be generated by a game engine, describes gameplay during a given video game session such that events occurring during the video game session may be recreated. For instance, a game log may include information that indicates one or more game events that have occurred during gameplay. Because a game log specifies game events that occurred during gameplay rather than a rendering (into video, for example) of the gameplay, a given game log occupies a much smaller size footprint than a conventional video of the gameplay.

The system may assign an identifier to a game log and store the game log and its corresponding identifier (as well as any video game information) in a database. Game logs may be persistently stored in the database for later search and retrieval. In this manner, game logs of interest may be searched for or otherwise obtained. Of course, game logs may be streamed and provided to end users in substantially real-time as well.

The system may generate a Video Game Stream ("VGS") based on a game log and one or more metadata tracks that include content (also referred to herein as metadata) that annotate the game log. In some instances, the system may store an association between metadata and a game log. For instance, a given game log may be associated with one or more metadata tracks. In this manner, a viewer or others may be able to pick and choose which metadata is to be used to annotate a given game log. As such, multiple VGSs may be generated based on a single game log, each VGS associated with its own set of metadata.

A metadata track may include one or more types of metadata to annotate a game log. Such metadata types may include, for example, audio, visual, tactile, and/or other types of information that can be used to annotate a game log. For example, metadata may include commentary (e.g., from an e-sports announcer, a player involved in gameplay, a user not involved in gameplay, etc.), graphical overlays, tactile information, and/or other content.

In some instances, a metadata track may include alternate "camera" angles. For example, a game log may capture gameplay from a given camera angle or perspective. A metadata track may include a different perspective and another metadata track may include yet another perspective. In this manner, a given game log may be associated with different metadata tracks, each providing its own perspective view of gameplay.

In some instances, a metadata track may include loadout information that indicates a state of a player and/or video game environment during gameplay that is represented in a game log. For instance, the loadout information may indicate a state of a player (e.g., the equipment or power-ups used by the player), a virtual object (e.g., virtual weapon/ammo) used, a video game level (e.g., a virtual racetrack, a virtual boss, etc.), a video game level of difficulty, and/or other state of the video game during gameplay represented in a game log. The loadout information may be used to recreate the conditions of gameplay. For instance, when decoded, a VGS that includes a metadata track with loadout information may provide the viewer with an option to attempt to play the video game under the same loadout conditions as in the video game playback. This may be useful when, for example, a user wishes to view a tutorial on how to defeat a particular level, a user wishes to achieve a better score than a friend who shared the VGS with loadout to challenge the user, and/or other situations in which a user may wish to recreate loadout conditions associated with a video game playback. In some instances, the metadata track includes information about the game state that was not available or readily apparent to one or more players. For example, a first player may have employed an invisibility power-up such that an opponent could not see the first player's attack. The metadata track, however, may include information that allows the viewer to see the first player's attack (e.g., by presenting the first player as transparent to indicate invisibility).

In some instances, the system may generate a loadout object. A loadout object may refer to all or a portion of a VGS. For instance, the loadout object may specify to all or portion of a game log and/or all or a portion of a metadata track that includes loadout information. In this manner, a given loadout object may be used to convey a state of a particular gameplay session (or portion of a gameplay session, such as a given time interval of the gameplay session). Loadout objects may be generated automatically by the system and/or based on user input. For instance, loadout objects may be automatically generated based on inference information (described herein) or user input that specifies a portion or all of a VGS (associated with gameplay of the user or gameplay of others) that should be made into a loadout object.

A loadout object may be configured as a virtual trading card, a Skylanders™ object, and/or other virtual or actual object that can convey loadout information such that others may replicate a state of gameplay described by the loadout information. Users may acquire, share, trade, and/or otherwise use loadout objects to enable recreating a given state of a given gameplay session (or portion of the gameplay session), whether to play a video game using the same state or to simply view the gameplay associated therewith.

In some instances, a loadout object may refer to single player gameplay or multiplayer gameplay (e.g., a competitive and/or cooperative match between multiple players). In multiplayer gameplay implementations, two or more users with whom the loadout object has been shared may enter a multiplayer match using a video game state specified (and/or identified) by the loadout object.

The system may use a given loadout object to place a user with whom the loadout object has been shared into a match. For instance, a matchmaking engine (which places users into matches) may use a loadout object to place one or more players into a gameplay match that includes the loadout condition(s) specified or identified by the loadout object.

In some instances, the system may associate users with loadout objects. For instance, the system may store an indication of loadout objects that the user has shared, viewed, participated in gameplay that replicates loadout conditions, or otherwise interacted with.

The system may receive, from a user, an annotation of a given loadout object. For instance, a user may include a comment or other content relating to the loadout object. Users with whom the loadout object has been shared (or others) may view the annotations by the user.

In some instances, a metadata track may include microtransaction information that identifies an item available for purchase. In some instances, the item may include a virtual item depicted in a corresponding video game playback, or a real-world item advertised as an overlay over the corresponding video game playback. In some instances, the metadata track may include hotspot information that indicates selectable coordinates on the video game playback corresponding to the item available for sale. For instance, in a shooter game, a location on the display (e.g., pixel position) of a virtual weapon that may be purchased by the viewer for use in the viewer's gameplay may be encoded in the metadata track. In this instance, during playback, the viewer may be able to select the location (e.g., the "hotspot"), which causes a purchase transaction to occur. The purchase transaction may cause the virtual item to be made available to the viewer when the viewer plays the video game. Similarly, an advertising item may be selected to cause a purchase transaction for a real-world item to be initiated.

In some instances, a metadata track may include player profile information that describes a player involved in a video game and/or a player's avatar. The system may obtain the player profile information from a pre-stored player profile database, meta data that may accompany a game log, a game log annotator (as will be described herein), and/or other source. All or a portion of the player profile information may be used annotate a VGS so that viewers (e.g., users who view a replay of gameplay) may be provided with background or other information relating to the player.

The system may provide authoring tools that provide one or more inputs configured to accept user-provided content to create metadata tracks. Such tools may provide video game playback (e.g., display a playback so that a user can input commentary or other content) and accept content for creating metadata tracks.

In some instances, the system may cause different metadata tracks to be layered onto one another. For instance, a first user may provide content (e.g., his commentary on gameplay) for a first metadata track to annotate a game log. A second user may obtain the game log and the first metadata track and provide further commentary (such as a translation of the first user's commentary and/or additional commentary or content) for a second metadata track to annotate the game log and the first metadata track. The different metadata tracks may be played/overlaid together with other metadata tracks (allowing combinations of metadata to enrich a given game log) or separately.

Certain annotation may cause content to be removed from a video game playback. Such removed content may include background music, certain sound or visual effects, conversation between players, etc. As such, a metadata track may include an instruction to omit or remove certain content that appears in a game log (e.g., an instruction to omit a sound track during video game playback during a certain time interval). Such removal may be used in conjunction with content to be added. For instance, for a sports video game playback, commentary from the artificial intelligence commentator may be replaced with a user's commentary. Such removal of content may be used in other ways as well, such as to focus on particular clips (e.g., a 30 second clip) by removing remaining portions of a playback.

The system may synchronize a given metadata track with events in a game log so that the content from the metadata track is replayed alongside a replay of gameplay at the appropriate time. In some instances, the system may synchronize a metadata track with a timeline associated with the game log. For instance, the game log may be associated with a game log timeline that includes a timestamp for each event. The timestamp may indicate a time that a given event has occurred relative to the start of the game log. The system may assign events or content within the metadata track with a timestamp that corresponds to the game log timeline. In some instances, timestamps not necessarily associated with a game event may be added as well, to serve as editing/guidepost marks.

The system may facilitate searching for, identifying, and localizing a VGS. For instance, the system may identify combinations of metadata tracks that should be used to annotate a game log. The system may identify an appropriate metadata track responsive to search inputs from a user, automatically based on localization rules, key word tags assigned by users or the system, and/or other information that can be used to identify a suitable metadata track for a given game log.

In a non-limiting example, a user may specify that she wishes to view a video game replay of a particular game title involving a particular player with commentary in the English language. Responsive to the search inputs, the system determine whether any of the game logs match search criteria specified by the search inputs relating to game logs (namely, the particular game title involving the particular player). If one or more game logs that satisfy the criteria are found (or simultaneously with the previous query), the system may determine whether any metadata tracks have been associated with the one or more game logs, and if so, present the results to the user for selection.

Upon receipt of a selection of a game log and any corresponding metadata tracks, the system may generate a VGS based on the game log and corresponding metadata tracks that have been custom provisioned to the user's query.

In some instances, once a VGS has been generated responsive to the search request, the requesting user may further annotate the VGS to generate further metadata tracks by that user, in which case the new metadata tracks will be associated with the game log and/or existing metadata tracks for later search and retrieval by the user or others.

In some instances, the system may automatically select a given metadata track for a game log based on one or more localization rules. A localization rule may specify that certain metadata tracks be used with a game log based on a native language of a geographic location to which a VGS is to provided, a custom of a geographic location to which a VGS is to provided, and/or other localization, and/or other criteria that can be used to automatically select a given metadata track for use with a game log. In some instances, metadata tracks need not be decoded/read by a game engine. For instance, a given metadata track may include conventional video/audio/etc. encoded in a conventional media format that may be played at an end user device via conventional media player. In these instances, for example, an audio track (e.g., with a translation of commentary or other content) may be included with a VGS.

The system may obtain and decode a VGS to provide a video game playback. For instance, the system may provide the game log to a corresponding game engine that created the game log and receive, back from the game engine, a video game playback that is unannotated. The system may parse metadata tracks and synchronize content therein with the video game playback from the game engine.

In an implementation, the system may make a video game playback static or interactive. In static instances, the video game playback may not be interacted with by a viewer other than through ordinary media player controls (e.g., play, pause, etc). Instead, the video game playback is linear, view-only.

In interactive instances, the video game playback may include hotspots or otherwise cause interactive elements configured to receive user inputs. For example, when a VGS includes loadout information, the system may parse the loadout information and provide the viewer with an option to recreate the loadout conditions specified by the loadout information. Upon receipt of an indication from the viewer to play under the loadout conditions, the system may provide the loadout information to a game engine, which may render the video game with the loadout conditions so that the viewer may play the video game under the same conditions as the video game playback.

In another example, when a VGS includes micro-transaction hotspots, the system may parse the hotspot or pixel position information and provide selectable regions within the user interface that corresponds to a virtual or real item in the video game playback that is available for purchase. Upon receipt of a selection of a hotspot, the system may either automatically cause a purchase of a corresponding item (e.g., by looking up pre-stored financial account information of the viewer or virtual currency account information of the viewer) or cause a transaction interface to be presented to the viewer, which allows the user to input (financial or virtual) account information. In some implementations, the hotspot item may be changed from time to time. For instance, an advertised item may be changed from one product to another product, depending on sponsorships, ad contracts, etc. Additionally or alternatively, the system may change the in-game placement of such ads (and corresponding hotspot).

In an implementation, the consumption and/or creation of metadata tracks may be subject to different levels of subscriptions. Users may subscribe to different levels of subscription by providing user information, payments, and/or other items of value. For example, a user may pay a higher fee to access premium metadata tracks (e.g., commentary from experienced e-sportscasters), or no fee to access a standard set of (or zero) metadata tracks.

In an implementation, the system may convert a VGS into a conventional media format for sharing on sites or devices that are not configured to interpret a game log or metadata track. Such conversion may occur via server-based processing (e.g., on computer system 110), distributed processing using end user devices 140, cloud services processing (e.g., via cloud computer systems), and/or through other computer processing techniques.

In some instances, the system may provide access to game logs and metadata tracks through an API. The API may provide access to a game log and any corresponding metadata track as a conventional media file that can be played in a conventional media player.

In an implementation, the system may generate an inferred object that identifies a VGS and a portion of the VGS in which the user(s) is inferred to be interested. An inferred object may include an identification of the VGS, an identification of a game log, an identification of specific portion(s) of the game log, an identification of a player character/avatar, an identification of a metadata track (e.g., particular commentary, graphics, camera angles, etc.), an identification of specific portion(s) of the metadata track, and/or other information that can specify all or a portion of a VGS in which users are likely interested. Based on the inferred object, the system may generate a separate VGS or a metadata track to be part of an existing VGS. In this manner, the system may cause playback of gameplay of entire gameplay sessions or portions thereof that are expected to be of interest to one or more users. Inferred objects may be used by the system in other ways as well (e.g., to drive micro-transactions), as described herein.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The invention described herein relates to a system and method of generating a game log that specifies game events during gameplay to enable efficient distribution of video game playback, facilitating the annotation (and replication) of gameplay through content from users and others, and generating a video game stream that includes the game log and content. While aspects of the invention may be described herein with reference to particular types of video game genres, the system and method described in detail herein may be used in any genre of single or multiplayer video game.

Exemplary System Architecture

Figure 1:
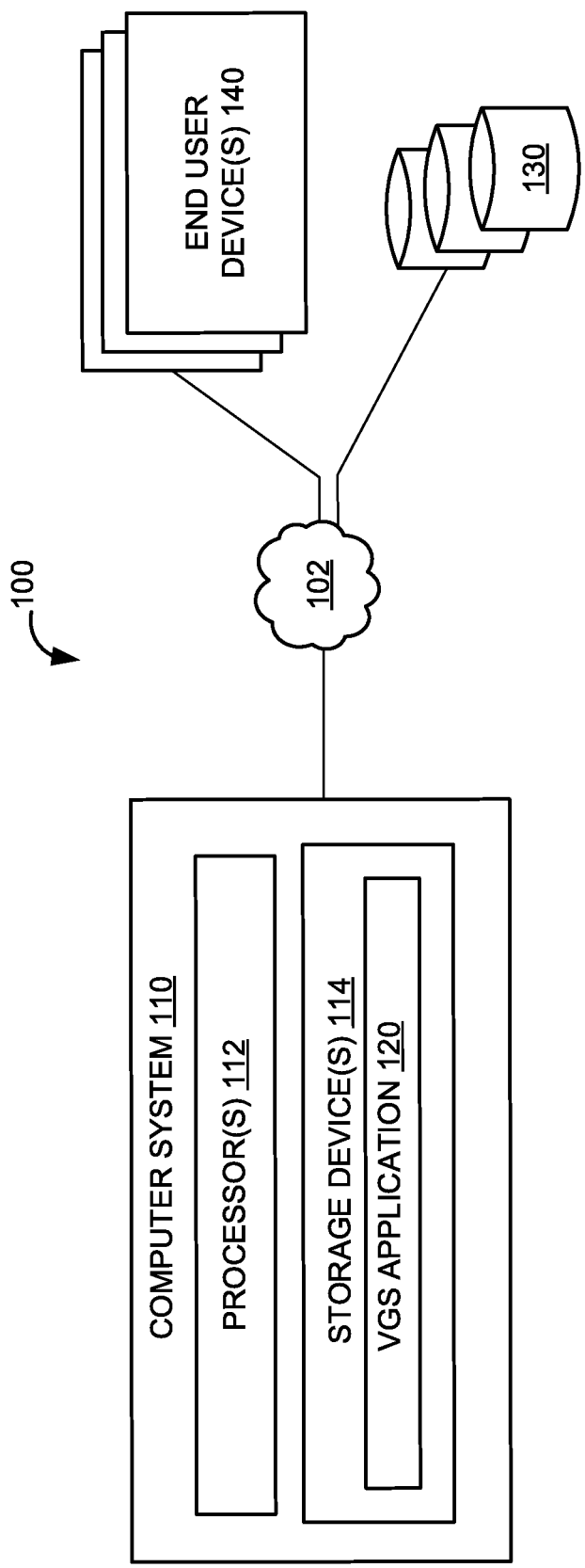
FIG. 1 illustrates a system of generating and distributing video game streams, according to an implementation of the invention.

FIG. 1 illustrates a system 100 of generating and distributing video game streams, according to an implementation of the invention. In one implementation, system 100 may include a computer system 110, one or more databases 130, one or more end user devices 140, and/or other components.

Computer System 110

Computer system 110 may be configured as a server (e.g., having one or more server blades, processors, etc.), a gaming console, a handheld gaming device, a personal computer (e.g., a desktop computer, a laptop computer, etc.), a smartphone, a tablet computing device, and/or other device that is programmed to encode, decode, and/or distribute game streams as described herein.

Computer system 110 may include one or more processors 112 (also interchangeably referred to herein as processors 112, processor(s) 112, or processor 112 for convenience), one or more storage devices 114 (which may store a VGS application 120), and/or other components. Processors 112 may be programmed by one or more computer program instructions. For example, processors 112 may be programmed by video game stream application 120 and/or other instructions. VGS application 120 may include various instructions that program computer system 110. As described herein, VGS application 120 will be described as programming computer system 110 to perform various operations. However, it should be understood that a portion (or all) of VGS application 120 may, alternatively or additionally, program other system components (e.g., end user device 140) to perform at least some of the functions of VGS application 120.

End User Devices 140

End user device 140 may be configured as a gaming console, a handheld gaming device, a personal computer (e.g., a desktop computer, a laptop computer, etc.), a smartphone, a tablet computing device, and/or other device that can be programmed to present a video game to be played, view a video game replay, encode a game log, generate a metadata track, and/or perform other functions described herein. Although not illustrated in FIG. 1, end user devices 140 may include one or more physical processors programmed by computer program instructions. For example, end user device 140 may be programmed by all or a portion of VGS application 120.

Although illustrated in FIG. 1 as a single component, computer system 110 and end user device 140 may each include a plurality of individual components (e.g., computer devices) each programmed with at least some of the functions described herein. In this manner, some components of computer system 110 and/or end user device 140 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112 are programmed to perform the functions described herein.

Furthermore, it should be appreciated that although the various instructions are illustrated in FIG. 1 as being co-located within a single processing unit, in implementations in which processor(s) 112 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, or other storage media for storing computer-executable instructions and/or data.

Databases 130

The various databases 130 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

VGS Application 120

Figure 2:
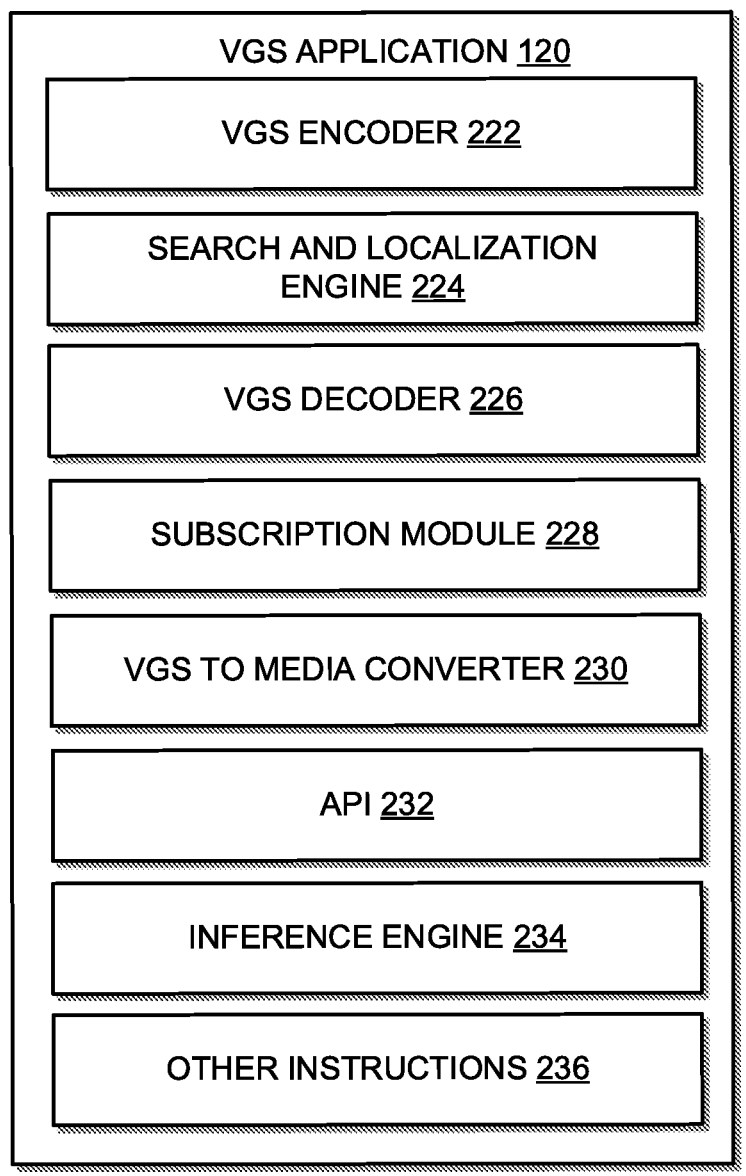
FIG. 2 depicts a block diagram of a video game stream application, according to an implementation of the invention.

FIG. 2 depicts a block diagram of VGS application 120, according to an implementation of the invention. The instructions of VGS application 120 may include, without limitation, a VGS encoder 222, a search and localization engine 224, a VGS decoder 226, a subscription module 228, a VGS to media converter 230, an Application Programming Interface ("API") 232, an inference engine 234, and/or other instructions 236 that program computer system 110 to perform various operations, each of which are described in greater detail herein. As used herein, for convenience, the various instructions will be described as performing an operation, when, in fact, the various instructions program the processors 112 (and therefore computer system 110) to perform the operation.

Game Logs

In an implementation, VGS encoder 222 may obtain a game log and generate a VGS based on the game log. A game log, which may be generated by a game engine, describes gameplay during a given video game session such that events occurring during the video game session may be recreated. In a sense, a game log may be thought of as a recording of events that occurred during gameplay, even though a game log may not be a "video recording" per se in that the game log itself is not played back by a conventional media player (unless converted to a conventional media format as described herein). Instead, a game log may include information that indicates one or more game events that have occurred during gameplay. In an implementation, a game log may include information relating to player activity during gameplay such as the presence or absence of player chats via headsets, the amplitude/volume of such headset chat, texting/chatting in out-of-band streams, observed physical behavior of a player (e.g., a player standing, jumping, etc.) based on inputs from peripheral devices such as cameras, and/or other player activity information.

Accordingly, gameplay that occurred during a video game session may be replayed based on the game events (hereinafter, such replay based on a game log will be referred to as a "video game playback" even though a replay may occur substantially in real-time—e.g., as a gameplay session is occurring—or not in real-time—e.g., stored and later retrieved for later video game playback). Because a game log specifies game events that occurred during gameplay rather than a rendering of the gameplay, a given game log occupies a much smaller footprint than a conventional media file that would, for example, render video of the gameplay.

The game events may include, without limitation, a player's input, a game engine's response to a player's input, an interaction between a bot and another player (e.g., another human player or another bot), an interaction between virtual objects and other objects or players, and/or other event that can occur during gameplay. A game event may be recorded as information that encodes the event. For instance, a game event may be encoded as a generic event, such as "player input button A," or a specific event (e.g., specific to a particular game), such as "player defeated boss X." A computer readable mapping of events to encodings may be stored in VGS database as well, in which case a game log may simply include encodings that map to particular events.

A given game log may be associated with video game information such as, without limitation, a video game title, a video game genre related to the video game title, a publisher of the video game title, the names of player(s) involved in a video game session to which the game log relates, and/or other information relating to the video game or video game session to which the game log relates.

In an implementation, VGS encoder 222 may assign an identifier to an obtained game log and store the game log and its corresponding identifier (as well as any video game information) in a VGS database, such as a database 130. Game logs may be persistently stored in VGS database for later search and retrieval. In this manner, game logs of interest may be searched for or otherwise obtained.

Generating a VGS Based on a Game Log and Metadata

In an implementation, VGS encoder 222 may generate a VGS based on a game log and one or more metadata tracks (the term "track" is used with respect to metadata merely to illustrated that metadata may include discreet information separate from information from other metadata). A VGS may include a set of content that includes information from a game log (or the game log itself) and one or more metadata that annotate the game log. Such metadata may be stored separately from the game log (e.g., as an eXtensible Markup Language or other format file) or be integrated with the game log (or derivative of the game log) by compiling the game log and metadata tracks together. VGS encoder 222 may integrate a metadata track with a game log or otherwise compile the appropriate metadata track(s) along with the game log.

In implementations in which metadata is stored separately, an association between metadata and a game log may be created and stored in the VGS database. For instance, a given game log may be associated with one or more metadata tracks. In this manner, a viewer or others may be able to pick and choose which metadata is to be used to annotate a given game log. As such, multiple VGSs may be generated based on a single game log, each VGS associated with its own set of metadata.

Each metadata track may include information such as, without limitation, a region of origin (e.g., a geographic location, locality, etc.) where the metadata track was created, a language associated with the metadata track (e.g., a spoken or written language for its content), a demographic of a user that originated or otherwise created the metadata track, an identification of a program used to create the metadata track, a date the metadata track was created, and/or other information related to the metadata track. Such metadata information may be used to search for or otherwise filter different metadata to be used to generate a VGS. For instance, a viewer or others may wish to view a replay of a video game session with commentary in a particular language, in which case metadata relating to the particular language may be searched for and used (as will be described in more detail herein) to generate an appropriate VGS. Each metadata track may include one or more different types of content as well.

Types of Metadata

In an implementation, a metadata track may include one or more types of metadata to annotate a game log. Such metadata types may include, for example, audio, visual, tactile, and/or other types of information that can be used to annotate a game log.

Audio metadata may include audio signals relating to gameplay. For example, and without limitation, the audio signals may encode utterances from an e-sportscaster (e.g., one who, professionally or as a hobby, comments on gameplay), utterances from one or more players involved in gameplay, utterances from one or more users not involved in gameplay, sound effects added by one or more users or VGS encoder 222, and/or other audio signals that can be output as audio alongside a video game playback.

Visual metadata may include graphical objects displayed alongside (e.g., overlaid onto) a video game playback. Similar to the audio metadata, the visual metadata may originate from e-sportscasters (or their production crews), players, other users, VGS encoder 222 (e.g., automatically generated), and/or others.

Tactile metadata may include tactile signals relating to gameplay. For example, the tactile signals may cause tactile feedback to occur alongside a video game replay. Similar to the audio metadata, the tactile metadata may originate from e-sportscasters (or their production crews), players, other users, VGS encoder 222 (e.g., automatically generated), and/or others.

Metadata Tracks with Additional Camera Angles

In an implementation, a metadata track may include alternate "camera" angles. For example, a game log may capture gameplay from a given camera angle or perspective. A metadata track may include a different perspective and another metadata track may include yet another perspective. In this manner, a given game log may be associated with different metadata tracks, each providing its own perspective view of gameplay. In a particular example, each metadata track may correspond to a first-person-view of a player in a multi-player first-person shooter game (or other game that includes a first-person perspective view of gameplay). Because each metadata track may be associated with information that identifies a corresponding player, viewers may choose which metadata track to use, effectively being able to toggle different player's perspective view during video game playback. Other types of perspective views (other than first-person) may be used as well, such as a top-down view or scrolling view.

Metadata Tracks with Loadout Recreation

In an implementation, a metadata track may include loadout information that indicates a state of a player and/or video game environment during gameplay that is represented in a game log. For instance, the loadout information may indicate a virtual object (e.g., virtual weapon/ammo) used, a video game level (e.g., a virtual racetrack, a virtual boss, etc.), a video game level of difficulty, and/or other state of the video game during gameplay represented in a game log. The loadout information may be used to recreate the conditions of gameplay. For instance, when decoded, a VGS that includes a metadata track with loadout information may provide the viewer with an option to attempt to play the video game under the same loadout conditions as in the video game playback. This may be useful when, for example, a user wishes to view a tutorial on how to defeat a particular level, a user wishes to achieve a better score than a friend who shared the VGS with loadout to challenge the user, and/or other situations in which a user may wish to recreate loadout conditions associated with a video game playback.

In some instances, VGS encoder 222 may generate a loadout object. A loadout object may refer to all or a portion of a VGS. For instance, the loadout object may specify all or portion of a game log and/or all or a portion of a metadata track that includes loadout information. In this manner, a given loadout object may be used to convey a state of a particular gameplay session (or portion of a gameplay session, such as a given time interval of the gameplay session). Loadout objects may be generated automatically by the system and/or based on user input. For instance, loadout objects may be automatically generated based on inference information (described herein) or user input that specifies a portion or all of a VGS (associated with gameplay of the user or gameplay of others) that should be made into a loadout object.

A loadout object may be configured as a virtual trading card, a Skylanders™ object, and/or other virtual or actual object that can convey loadout information such that others may replicate a state of gameplay described by the loadout information. Users may acquire, share, trade, and/or otherwise use loadout objects to enable recreating a given state of a given gameplay session (or portion of the gameplay session), whether to play a video game using the same state or to simply view the gameplay associated therewith.

In some instances, a loadout object may refer to single player gameplay or multiplayer gameplay (e.g., a competitive and/or cooperative match between multiple players). In multiplayer gameplay implementations, two or more users with whom the loadout object has been shared may enter a multiplayer match using a video game state specified (and/or identified) by the loadout object.

VGS encoder 222 may use a given loadout object to place a user with whom the loadout object has been shared into a match. For instance, a matchmaking engine (which places users into matches) may use a loadout object to place one or more players into a gameplay match that includes the loadout condition(s) specified or identified by the loadout object.

In some instances, VGS encoder 222 may associate users with loadout objects. For instance, the system may store an indication of loadout objects that the user has shared, viewed, participated in gameplay that replicates loadout conditions, or otherwise interacted with.

VGS encoder 222 may receive, from a user, an annotation of a given loadout object. For instance, a user may include a comment or other content relating to the loadout object. Users with whom the loadout object has been shared (or others) may view the annotations by the user.

Metadata Tracks with Micro-Transaction Hotspots

In an implementation, a metadata track may include micro-transaction information that identifies an item available for purchase. In some instances, the item may include a virtual item depicted in a corresponding video game playback, or a real-world item advertised as an overlay over the corresponding video game playback.

In some instances, the metadata track may include hotspot information that indicates selectable coordinates on the video game playback corresponding to the item available for sale. In an implementation, the hotspot information may be generated from a game engine. Because the game engine rendered graphics for a given video game session, it may encode the hotspot information into a metadata track so that a video game playback of the video game session may include selectable regions. For instance, in a shooter game, a location on the display (e.g., pixel position) of a virtual weapon that may be purchased by the viewer for use in the viewer's gameplay may be encoded in the metadata track. In this instance, during playback, the viewer may be able to select the location (e.g., the "hotspot"), which causes a purchase transaction to occur. The purchase transaction may cause the virtual item to be made available to the viewer when the viewer plays the video game. Similarly, an advertising item may be selected to cause a purchase transaction for a real-world item to be initiated.

Metadata Tracks with Player Profiles for VGS Enhancements

In an implementation, a metadata track may include player profile information that describes a player involved in a video game and/or a player's avatar. VGS encoder 222 may obtain the player profile information from a pre-stored player profile database (e.g., a database 130), meta data that may accompany a game log, a game log annotator (as will be described herein), and/or other source. All or a portion of the player profile information may be used annotate a VGS so that viewers (e.g., users who view a replay of gameplay) may be provided with background or other information relating to the player.

The player profile information may include human player information that describes an actual (human) player and/or avatar information that describes an avatar controlled by the player. For instance, the human player information may include, without limitation, a user demographic (e.g., age, gender, ethnicity, residence location, familial information, marital/relationship status, etc.), social media handles, a number of years of experience playing games (e.g., on a professional level or as a hobby), the player's favorite game(s), a player's gameplay statistics, sponsorships (if any), and/or other information relating to the player. Avatar information may include, without limitation, virtual health or experience levels, statistics relating to the avatar (e.g., max power, special powers/skills/abilities, etc.), and/or other information relating to an avatar.

In an implementation, while encoding a VGS, all or a portion of the player profile information may be used to describe a player (or the player's avatar). For example, a player's name, prior or historical game statistics, or other player information may be overlaid onto a player's avatar so that viewers may be able to view the player information during a playback of gameplay facilitated by a VGS. Such overlays may integrated with the playback or be provided on a separate track so that the end user may toggle such feature on or off.

Authoring Tools to Create Metadata Tracks

In an implementation, VGS encoder 222 may provide one or more inputs configured to accept user-provided content to create metadata tracks. Such tools may provide video game playback (via VGS decoder 226 described herein) and accept content for creating metadata tracks. For instance, an VGS encoder 222 may include an audio input interface configured to receive utterances or other audio from users. In this manner, a user may view a video game playback, which is generated based on a corresponding game log, and provide commentary or other audio, which may be synchronized with the corresponding game log. Alternatively or additionally, an VGS encoder 222 may include a graphical input interface configured to receive graphical inputs or other graphical markup to be overlaid onto a video game playback. As with the audio input, the graphical input may be synchronized to the corresponding game log. Still alternatively or additionally, an VGS encoder 222 may include a tactile input interface configured to receive tactile inputs that specify tactile feedback to be provided during video game playback. In this manner, a user may design particular tactile feedback that should be output during a video game playback in relation to a corresponding game log to which the tactile feedback may be synchronized.

In some instances, VGS encoder 222 may cause different metadata tracks to be layered onto one another. For instance, a first user may provide content (e.g., his commentary on gameplay) for a first metadata track to annotate a game log. A second user may obtain the game log and the first metadata track and provide further commentary (such as a translation of the first user's commentary and/or additional commentary or content) for a second metadata track to annotate the game log and the first metadata track. In this manner, the second user may annotate the first user's commentary (or other content) with the second user's commentary (or other content). Likewise, a third user may annotate the first user's commentary and/or the second user's commentary. In some instances, VGS encoder 222 may automatically create a metadata track. For instance, using a speech recognition engine, VGS encoder 222 may process a first metadata track containing a user's commentary in a first language, then translate the recognized text into a second language. The text may be used as subtitles in the automatically generated metadata track or may be processed using a text-to-voice engine so that a machine uttered translation may be stored in the automatically generated metadata track.

In these instances, VGS encoder 222 may store a parent-child or other association in the VGS database between information identifying a game log and information identifying the first metadata track, as well as a parent-child or other association between information identifying the first metadata track and information identifying the second metadata track to indicate that the second metadata track should be used in combination with the first metadata track. In some instances, despite the association, the second metadata track may still be used to annotate the game log without the first metadata track. For instance, if the second metadata track includes a translation into another language of the commentary from a first metadata track, the second metadata track may be separately provided to those interested listening to the commentary in the other language.

Although described herein with respect to adding content to video game playback, such playback may be "annotated" by removing certain aspects of the playback. For instance, VGS encoder 222 may be configured to receive an input that removes certain content from the video game playback. Such removed content may include background music, certain sound or visual effects, conversation between players, etc. As such, a metadata track may include an instruction to omit or remove certain content that appears in a game log (e.g., an instruction to omit a sound track during video game playback during a certain time interval). Such removal may be used in conjunction with content to be added. For instance, for a sports video game playback, commentary from the artificial intelligence commentator may be replaced with a user's commentary.

In some instances, VGS encoder 222 may add content that isn't necessarily related to the gameplay itself. For instance, VGS encoder 222 may receive inputs relating to graphical or audio advertisements or other content to be added to a corresponding video game playback. In this manner, ads or other content may be seamlessly incorporated into a corresponding video game playback.

Whether or not a given metadata track is to be used in combination with one or more other metadata tracks, and without regard to the type of content added (or removed), a given metadata track may be synchronized with a game log so that the content from the metadata track is replayed alongside a replay of gameplay at the appropriate time.

In some instances, VGS encoder 222 may synchronize a metadata track with a timeline associated with the game log. For instance, the game log may be associated with a game log timeline that includes a timestamp for each event. The timestamp may indicate a time that a given event has occurred relative to the start of the game log. VGS encoder 222 may assign events or content within the metadata track with a timestamp that corresponds to the game log timeline.

In some instances, VGS encoder 222 may establish a master timeline that applies to the game log and any metadata tracks. In these instances, events specified in the game log and content in any metadata tracks may be synchronized to the master timeline.

In instances in which a second metadata track is to be used in combination with a first metadata track, VGS encoder 222 may synchronize the second metadata track with a timeline associated with the first metadata track (i.e., the second metadata track may be synchronized to the first metadata track). In other instances, VGS encoder 222 may synchronize both the first metadata track and the second metadata track with a master timeline or a game log timeline.

In some instances, VGS encoder 222 may generate and store a VGS based on a game log and one or more metadata tracks. In other instances, because a given game log may be associated with different sets of one or more metadata tracks, or may be streamed live with real-time metadata tracks, VGS encoder 222 may dynamically create (e.g., responsive to requests or for real-time gameplay streams) particular combinations of a game log and metadata tracks.

Searching for and Localizing a VGS

In an implementation, search and localization engine 224 may identify combinations of metadata tracks that should be used to annotate a game log. For instance, search and localization engine 224 may identify an appropriate metadata track to responsive to search inputs from a user, automatically based on localization rules, and/or other information that can be used to identify a suitable metadata track for a given game log.

In some instances, for example, search and localization engine 224 may provide a user interface that provides one or more search inputs that are configured to receive a search input. The search input may relate to the game log (e.g., using the searchable information previously described) and/or one or more metadata tracks. Responsive to receipt of one or more search inputs, search and localization engine 224 may identify an appropriate game log and/or metadata track(s) for generation of a VGS (by VGS encoder 222, for example).

In a non-limiting example, a user may specify that she wishes to view a video game replay of a particular game title involving a particular player with commentary in the English language. Responsive to the search inputs, search and localization engine 224 may query VGS database to determine whether any of the game logs match search criteria specified by the search inputs relating to game logs (namely, the particular game title involving the particular player). If one or more game logs that satisfy the criteria are found (or simultaneously with the previous query), search and localization engine 224 may determine whether any metadata tracks have been associated with the one or more game logs, and if so, present the results to the user for selection.

Upon receipt of a selection of a game log and any corresponding metadata tracks, search and localization engine 224 may cause VGS encoder 222 to generate a VGS based on the game log and corresponding metadata tracks for provision to the user. Other examples involving alternative or additional search inputs/criteria may be used as well. For instance, the user may provide inputs specifying that particular commentators be returned for selection.

In some instances, once a VGS has been generated responsive to the search request, the requesting user may further annotate the VGS to generate further metadata tracks by that user, in which case the new metadata tracks will be associated with the game log and/or existing metadata tracks for later search and retrieval by the user or others.

In some instances, search and localization engine 224 may automatically select a given metadata track for a game log based on one or more localization rules. A localization rule may specify that certain metadata tracks be used with a game log based on a native language of a geographic location to which a VGS is to be provided, a custom of a geographic location to which a VGS is to be provided, and/or other localization, and/or other criteria that can be used to automatically select a given metadata track for use with a game log.

For instance, search and localization engine 224 may obtain a location of a user who is to be provided with a video game playback. Such location may be based on Internet Protocol address information, network connection information (e.g., network devices used to connect the user to the Internet), Global Positioning System or other location information based on a location device or receiver, and/or other location information.

Search and localization engine 224 may identify a native language associated with the location, and automatically select metadata track(s) that are in the native language (e.g., commentary spoken in the native language, ads presented in the native language, etc.). Alternatively or additionally, search and localization engine 224 may identify a custom or regional preference based on the location and automatically select appropriate metadata track(s) for the given game log. Such local customs or preferences may include, for example, a preference for tactile over audio annotations, in which case tactile metadata tracks may be automatically selected over audio metadata tracks.

In some instances, search and localization engine 224 may automatically select a given metadata track for a game log based on one or more personalization preferences. For instance, a user may provide preferences (e.g., language, audio and video preference over tactile, etc.), which may be stored in a user profile for that user. When the user requests or is otherwise is to be provided with a video game playback, search and localization engine 224 may automatically select appropriate metadata track(s) based on the personalization preferences.

Decoding a VGS

In an implementation, VGS decoder 226 may obtain a VGS and decode the VGS to provide a video game playback. For instance, VGS decoder 226 may decompile a VGS to obtain a game log and any corresponding metadata tracks. In other instances, VGS decoder 226 may obtain the game log and any corresponding metadata tracks packaged together, but in separate files.

In any event, in an implementation, VGS decoder 226 may provide the game log to a corresponding game engine that created the game log and receive, back from the game engine, a video game playback that is unannotated. VGS decoder 226 may parse any corresponding metadata tracks and synchronize content therein with the video game playback from the game engine. Such synchronization may be based on a master timeline VGS encoder 222 created, a time associated with the game log, and/or other timeline that can be used to synchronize events from the game log with content from the metadata tracks. In some instances, to synchronize events from the game log with content from the metadata tracks, VGS decoder 226 may store either or both of the events or content in a buffer or other memory while one is synchronized to the other.

In some instances, VGS decoder 226 may include (or be part of) the game engine, in which case VGS decoder 226 may be specific for a particular game or set of games for which the game engine provides gameplay. In other instances, VGS decoder 226 may be generic to different types of game engines (and therefore different types of games), in which case VGS decoder 226 may identify an appropriate game engine to use to read the game log to provide video game playback. For instance, the game log may be associated with identifying information that identifies the game engine and/or game title to which the game log relates. VGS decoder 226 may use the identifying information to identify an appropriate game engine to use. In either case, VGS decoder 226 may provide annotated video game playback using content from the metadata tracks synchronized with events from the game log.

In an implementation, VGS decoder 226 may dynamically change metadata tracks on the fly (e.g., during video game playback based on a game log). For instance, VGS decoder 226 may cause a user interface with selectable inputs corresponding to different metadata tracks to be provided that allow a user to specify which metadata track should be used. Alternatively or additionally, VGS decoder 226 may receive an input (e.g., via user remote control or other peripheral device input) corresponding to a command to change (e.g., replace, add, remove) a metadata track being used during video game playback. As previously described, a given metadata track may correspond to a perspective view of gameplay in which case a user may toggle through different perspectives. In other instances, a user may toggle through different languages, subtitles, or other content provided by different metadata tracks.

In an implementation, VGS decoder 226 may make a video game playback static or interactive. In static instances, the video game playback may not be interacted with by a viewer other than through ordinary media player controls (e.g., play, pause, etc). Instead, the video game playback is linear, view-only.

In interactive instances, the video game playback may include hotspots or otherwise cause interactive elements configured to receive user inputs. In these instances, VGS decoder 226 may cause a user interface that includes the video game playback and hotspots or interactive elements. For instance, when a VGS includes loadout information, VGS decoder 226 may parse the loadout information and provide the viewer with an option, in the user interface, to recreate the loadout conditions specified by the loadout information. Upon receipt of an indication from the viewer to play under the loadout conditions, VGS decoder 226 may provide the loadout information to a game engine, which may render the video game with the loadout conditions so that the viewer may play the video game under the same conditions as the video game playback.

In another example, when a VGS includes micro-transaction hotspots, VGS decoder 226 may parse the hotspot or pixel position information and provide selectable regions within the user interface that corresponds to a virtual or real item in the video game playback that is available for purchase. Upon receipt of a selection of a hotspot, VGS decoder 226 may either automatically cause a purchase of a corresponding item (e.g., by looking up pre-stored financial account information of the viewer or virtual currency account information of the viewer) or cause a transaction interface to be presented to the viewer, which allows the user to input (financial or virtual) account information. In some implementations, the hotspot item may be changed from time to time. For instance, an advertised item may be changed from one product to another product, depending on sponsorships, ad contracts, etc. Additionally or alternatively, the system may change the in-game placement of such ads (and corresponding hotspot).

VGS Subscription Models

In an implementation, the consumption and/or creation of metadata tracks may be subject to different levels of subscriptions. Users may subscribe to different levels of subscription by providing user information, payments, and/or other items of value.

In this implementation, different types of metadata tracks may be made available to users subject to a subscription level of the user. For instance, a free subscription level may be associated with a first set of metadata tracks, while a paid subscription level may be associated with additional sets of metadata tracks. In particular, some of the premium metadata tracks may be associated with celebrities or others whose commentary are more valued than others. In some of these implementations, different levels of paid subscriptions may be further subjected to different levels of metadata available to users.

Other consumption subscription models may be used as well, such as allowing more accesses to metadata tracks in a given time period for certain subscription levels than others (e.g., a paid subscription may be associated with access to a greater number of metadata tracks in a given month than a free subscription).

Likewise, in some implementations, an ability to create metadata tracks may be subject to a level of subscription. For instance, a first subscription level may be associated with allowing a user to create a first number of metadata tracks in a given month, while a second subscription level may be associated with allowing a user to create a second (different) number of metadata tracks in the given month. In some instances, subscriptions may be related to metadata tracks created by or related to one or more individuals (e.g., professional commentators, players, etc.). In such instances, the one or more individuals may share in the revenue generated by such subscriptions.

Converting VGS to Media

In an implementation, VGS to media converter 230 may generate a video game playback (e.g., using VGS decoder 226) and then convert the playback to a conventional media format such as the Moving Picture Experts Group (MPEG)-4 format as specified in the ISO/IEC 14496-12: 2004 specification, which is incorporated by reference herein in its entirety. Other media formats may be used as well; the MPEG-4 format is described here for illustrative purposes. In some instances, the video portion of the video game playback may be encoded as an MPEG-4 video stream, the audio portion of the video game playback may be encoded as an MPEG-4 audio stream, and any remaining metadata track may be encoded in the an MPEG-4 metadata stream. To be compatible with playback in conventional media players, VGS to media converter 230 may encode all metadata (whether visual, audio, etc.) into corresponding video or audio streams. Some media players may understand certain metadata streams (e.g., tactile signals within the metadata streams). To support those instances, VGS to media converter 230 may encode any tactile metadata tracks into an MPEG-4 metadata stream.

Such conversion may occur via server-based processing (e.g., on computer system 110), distributed processing using end user devices 140, cloud services processing (e.g., via cloud computer systems), and/or through other computer processing techniques.

APIs for Accessing and Sharing a VGS

In an implementation, API 232 may provide access to game logs and metadata tracks. In some instances, API 232 may provide a given game log and any corresponding metadata track as a VGS. In some instances, API 232 may provide access to a game log and any corresponding metadata track as a conventional media file that can be played in a conventional media player.

Whichever format in which a game log and/or metadata tracks are provided, API 232 may facilitate sharing of a game log and metadata tracks. For instance, a user may, through end user device 140, request to share a game log representative of a gameplay session being played or already played. The game log may be annotated with the user's content and/or other user's content, and then shared. API 232 may share the game log and metadata tracks, in any format described herein, to social sharing networks (e.g, YouTube™, Facebook™, etc.). Although described herein as relating to a video game session for convenience, a game log may relate to a continuous type of game (e.g., a virtual world simulation) that has no discrete ending. In these instances, a game log may refer to a segment of time during a portion of the continuous game. Alternatively, a game log may refer to a starting point in the continuous game and continue to "record" events indefinitely or until some terminating point has been reached. As such, a game log need not be limited to gameplay sessions that have a finite ending, but instead may relate to gameplay sessions that are continuous in nature.

Furthermore, it should be understood that a game log may be integrated with at least first metadata and stored in association with second metadata such that the game log integrally includes the first metadata and is associated with other metadata (e.g., the second metadata) as well.

Inferring Interest in a Portion or all of a Video Game Stream and Facilitate Playback of Content Based on the Inferred Interests In an implementation, inference engine 238 may generate an inferred object that identifies a VGS and a portion of the VGS in which the user(s) is inferred to be interested. An inferred object may include an identification of the VGS, an identification of a game log, an identification of specific portion(s) of the game log, an identification of a player character/avatar, an identification of a metadata track (e.g., particular commentary, graphics, camera angles, etc.), an identification of specific portion(s) of the metadata track, and/or other information that can specify all or a portion of a VGS in which users are likely interested.

For example, inference engine 238 may identify aspects of gameplay in which users may be interested, specific clips from gameplay, specific commentary or other metadata, and/or other aspects of a VGS in which users may be interested. Such identification may be specific for a particular user (or specific group of users such as a group of friends) or general for a non-specific population of users. For example, inference engine 238 may identify a portion or all of video gameplay (e.g., events of a game log) and/or metadata (e.g., commentary or other annotations) that a specific user or general population may be interested.

In an implementation, inference engine 238 may identify an inference object based on one or more inference factors, which may indicate user interest. An inference factor may include, without limitation, viewer input (e.g., camera angles/scenes viewers are using, voting inputs provided by viewers specifying all or portions of gameplay they wish to see, etc.), social sharing aspects (e.g., number of "likes" of video game playbacks, number of times a portion or all of a VGS has been shared or viewed, number of times that a user-generated video of gameplay has been created, etc.), player actions during gameplay (e.g., headset chatter from a player, chatter intensity—such as amplitude/frequency of audio input, whether the player has suddenly stood up/is jumping), and/or other inputs that can indicate user interest.

In an implementation, inference engine 238 may build inference models of user interests, which may be informed by one or more of the inference factors. In some instances, human analysts may analyze popular VGSs (e.g., VGSs that have been shared, viewed, etc. a number of times that exceed a threshold value) to identify events that are common between such VGSs, and input them for inclusion into the inference models. Inference engine 238 may also automatically perform such analysis, by determining common events or other aspects of gameplay that are common to popular VGSs.

In an implementation, inference engine 238 may initiate the creation of an inference object upon detection of one or more inference triggers. A given inference trigger may signal that an interesting event has occurred or will occur. Such triggers may be predefined (e.g., by a game developer) or may be dynamically determined based on an inference model. An inference trigger may include, without limitation, an indication that a player during gameplay has achieved a certain performance metric (e.g., exceeded a threshold in-game kill/death ratio, exceeded a threshold in-game kill streak, exceeded a threshold in-game number of kills within a particular time period, performed a particular in-game maneuver such as performing an in-game kill shot while jumping off a virtual building), in-game taunts (e.g., teabagging, doing a dance, jumping on a fallen opponent, showboating etc.), predictive triggers that use events to predict interesting gameplay will occur (e.g., a number of players converging on a particular location on a game map, a player moving toward a flag in a capture the flag match, a player entering a dangerous situation such as an ambush, a player imminently fighting a level boss, etc.), and/or other triggers that can indicate an event of likely interest has or will occur.

In some instances, the system (e.g., via VGS decoder 226) may generate a video game playback based on an inferred object. For example, if an inferred object relates to a specific 30 second highlight clip of gameplay for a 10 minute game, the system may generate a video game playback of the 30 second clip by identifying relevant events from the game log and/or content from relevant metadata tracks associated therewith.

In some instances, based on an inference object, the system may generate hints or suggestions of events or metadata related to a VGS that may be of interest to users. A user may use the hints (e.g., a listing of top 20 interesting events that occurred during gameplay) to generate a highlight clip relating to the events. Alternatively or additionally, the system may also automatically generate such a highlight clip. In another example, an e-sports commentator may be informed of particular events, camera angles, players being followed, etc., that are potentially interesting so that they can focus their commentary on such aspects of gameplay.

In some instances, based on an inference object, the system may generate loadout objects. For example, VGS encoder 222 may identify particular VGSs (or portions thereof) that users may be interested in duplicating for gameplay (or sharing) based on an inference object from inference engine 238. In this manner, loadout objects may be generated based on predicted user interested.

In some instances, inference engine 238 may generate an inference object in real-time. For example, during gameplay, inference engine 238 may identify a specific portion of gameplay that should be made into a replay clip, and cause the replay clip to be played. Various effects may be specified by an inferred object as well, such as slow-motion effects, zooming effects, and/or other type of visual effect to be applied to the replay clip (or other playback relating to an inference object).

Figure 3:
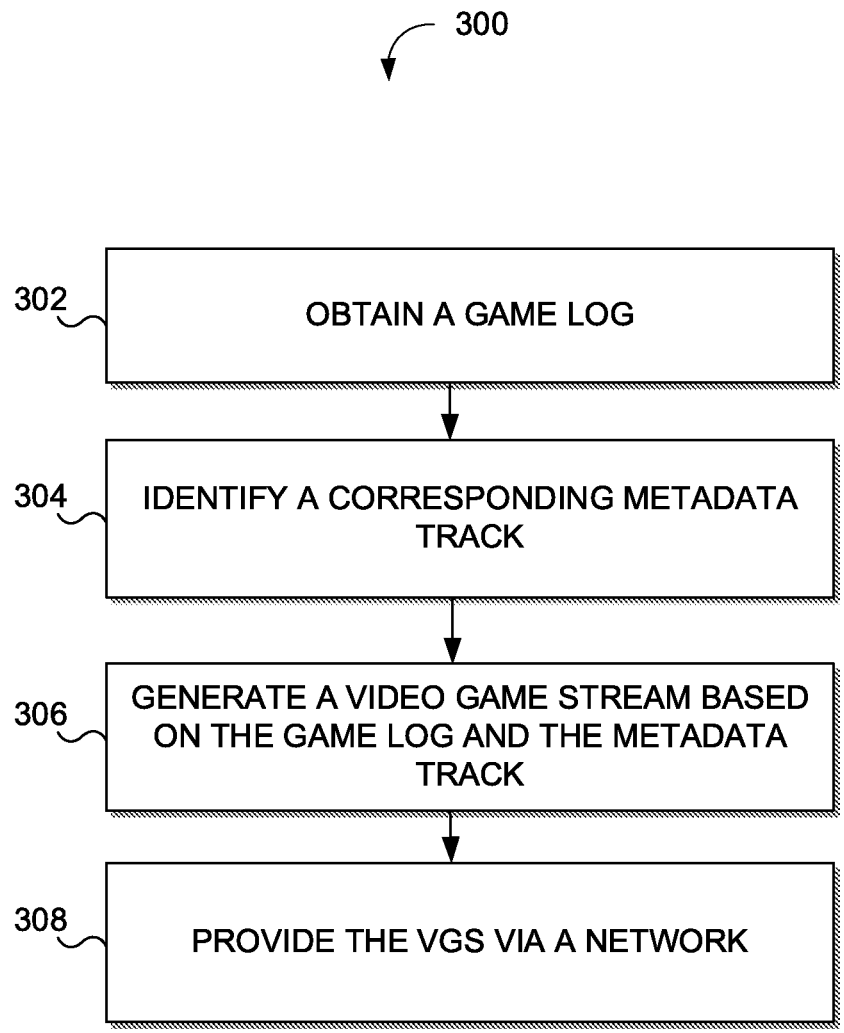
FIG. 3 depicts a process of generating a video game stream, according to an implementation of the invention.

FIG. 3 depicts a process 300 of generating a video game stream, according to an implementation of the invention. The various processing operations and/or data flows depicted in FIG. 3 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 302, process 300 may include obtaining a game log. The game log may be obtained from a game engine substantially in real-time as gameplay is occurring (e.g., at least some of the game log is received while a corresponding gameplay session is occurring) or the game log may be pre-stored (e.g., after the gameplay session has completed) and obtained from the VGS database. In some instances, process 300 may be performed by a game engine that generates a game log. In other instances, process 300 may be performed by a system component separate from the game engine, in which case the system component may obtain the game log directly or indirectly from the game engine. The game log may include or be associated with identifying information.

In an operation 304, process 300 may include identifying one or more metadata tracks that include content used to annotate a game log (i.e., gameplay represented by the game log). Process 300 may identify appropriate metadata tracks responsive to a user query and/or may automatically identify metadata tracks (e.g., based on localization rules or other criteria).

In an operation 306, process 300 may include generating a VGS that includes the game log and any corresponding metadata tracks. The VGS may be used to parse the game log and corresponding metadata tracks to generate a video game playback of the relevant gameplay session, along with any content from the corresponding metadata tracks. For instance, the video game playback may include a rendition of gameplay annotated with a user's commentary and/or other content.

In an operation 308, process 300 may include causing the VGS to be provided. For example, process 300 may cause the VGS to be transmitted to an end user device via a network. The end user device may then process the VGS to generate a video game playback annotated by content from the identified metadata tracks.

Figure 4:
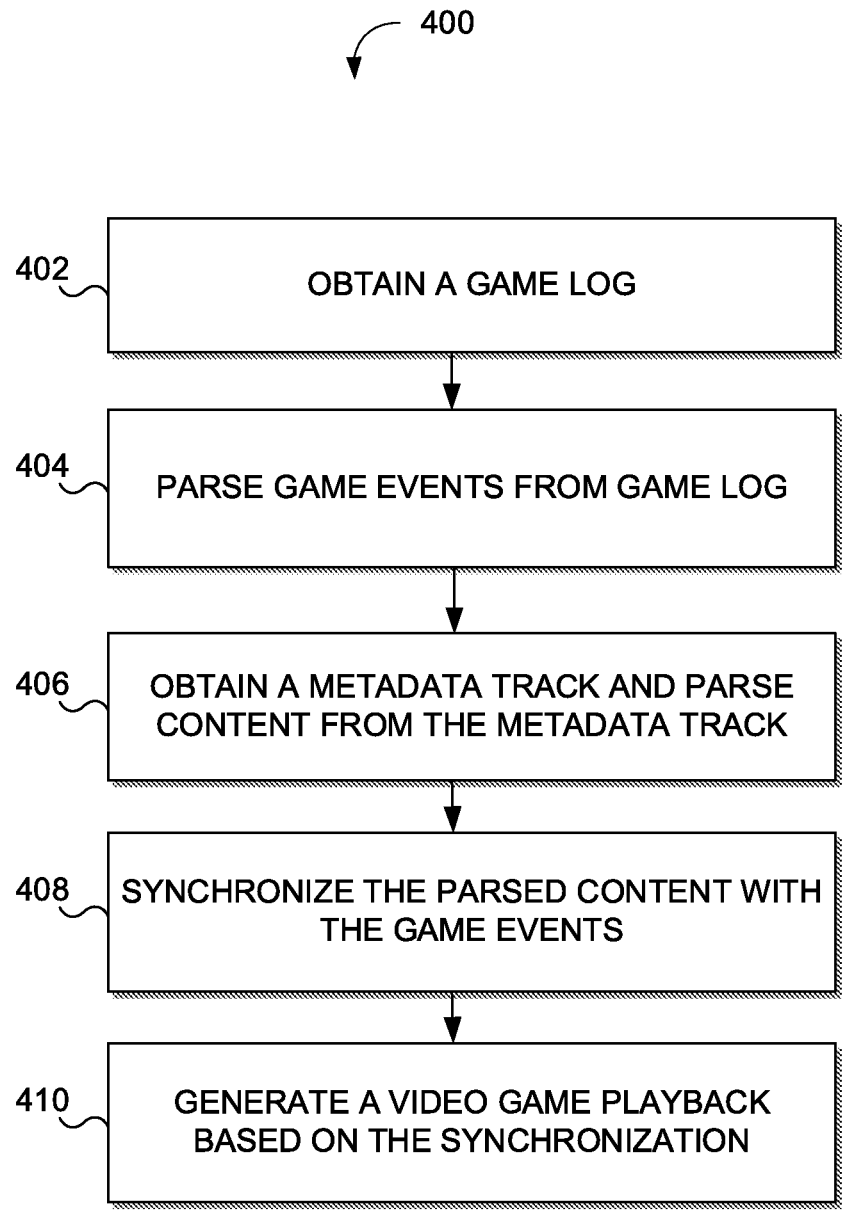
FIG. 4 depicts a process of decoding a video game stream to generate a video game playback, according to an implementation of the invention.

FIG. 4 depicts a process 400 of decoding a video game stream to generate a video game playback, according to an implementation of the invention.

In an operation 402, process 400 may include obtaining a game log. The game log may be obtained substantially in real-time while gameplay is occurring or from storage after gameplay has concluded.

In an operation 404, process 400 may include parsing events from the game log. In some instances, each event may be associated with a timestamp that indicates when in a game log timeline the event has occurred.

In an operation 406, process 400 may include obtaining a metadata track associated with the game log and parsing content from the metadata track. Each content may be associated with a timestamp that indicates a time that the content should be presented, relative to a game log timeline.

In an operation 408, process 400 may include synchronizing the parsed content with the events. The synchronization may be based on the game log timeline (or other timeline common to both the events and content).

In an operation 410, process 400 may include generating a video game playback based on the synchronized content and events. The video game playback may be in the form of a native rendering (e.g. by a game engine) or may be converted to a conventional media file format for replay.

Figure 5:
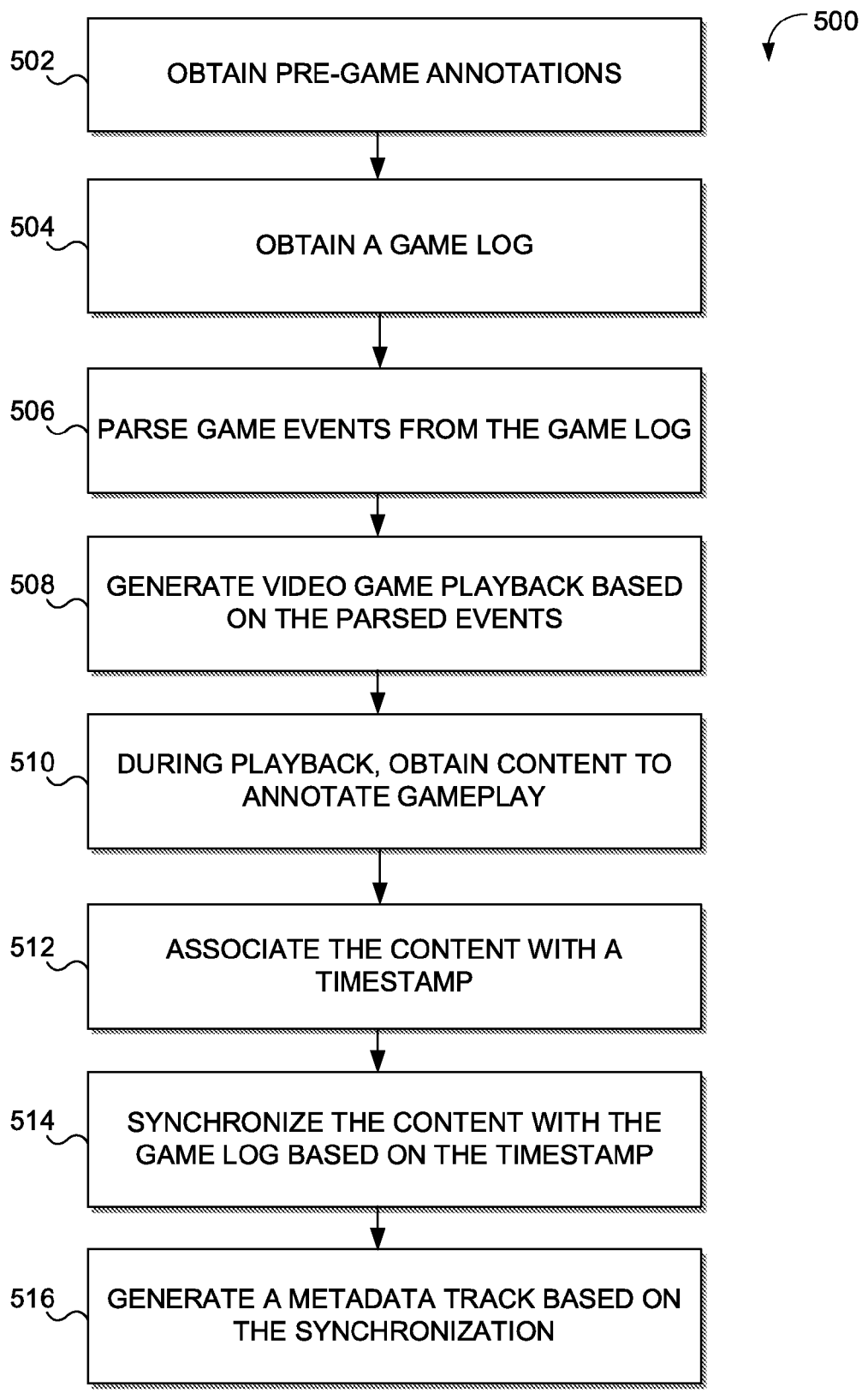
FIG. 5 depicts a process of annotating a video game log and encoding a video game stream, according to an implementation of the invention.

FIG. 5 depicts a process 500 of annotating a video game log and encoding a video game stream, according to an implementation of the invention. Process 500 may be used to annotate a game log, whether on top of existing annotation(s) of the game log or annotating the game log without other annotations.

In an operation 502, process 500 may include obtaining pre-game annotations. Such pre-game annotations may include initial content (e.g., commentary) on a gameplay session, such as a commentary on match-ups.

In an operation 504, process 500 may include obtaining a game log associated with the gameplay session.

In an operation 506, process 500 may include parsing the game log to obtain game events from the game log.

In an operation 508, process 500 may include generating a video game playback based on the game events.

In an operation 510, process 500 may include obtaining content to annotate gameplay during playback. Such content may include user commentary relating to gameplay, graphics to overlay onto gameplay, and/or other content described herein.

In an operation 512, process 500 may include associating the content with a timestamp relative to a timeline of the game log.

In an operation 514, process 500 may include synchronizing the content with the game log. For instance, the content may be synchronized with the game log based on a timeline associated with the game log or a master timeline associated with both the game log and other content that is to annotate the game log. In some instances, the game log timeline may be shifted to account for any pre-game annotations.

In an operation 516, process 300 may include generating a metadata track based on the synchronized content and storing an association between the game log and the metadata track. For instance, process 300 may include storing an association between identifying information for the game log and identifying information for the metadata track. In this manner, a database (such as the VGS database) may be used to query (or otherwise retrieve from) the game log and any corresponding metadata tracks.

Figure 6:
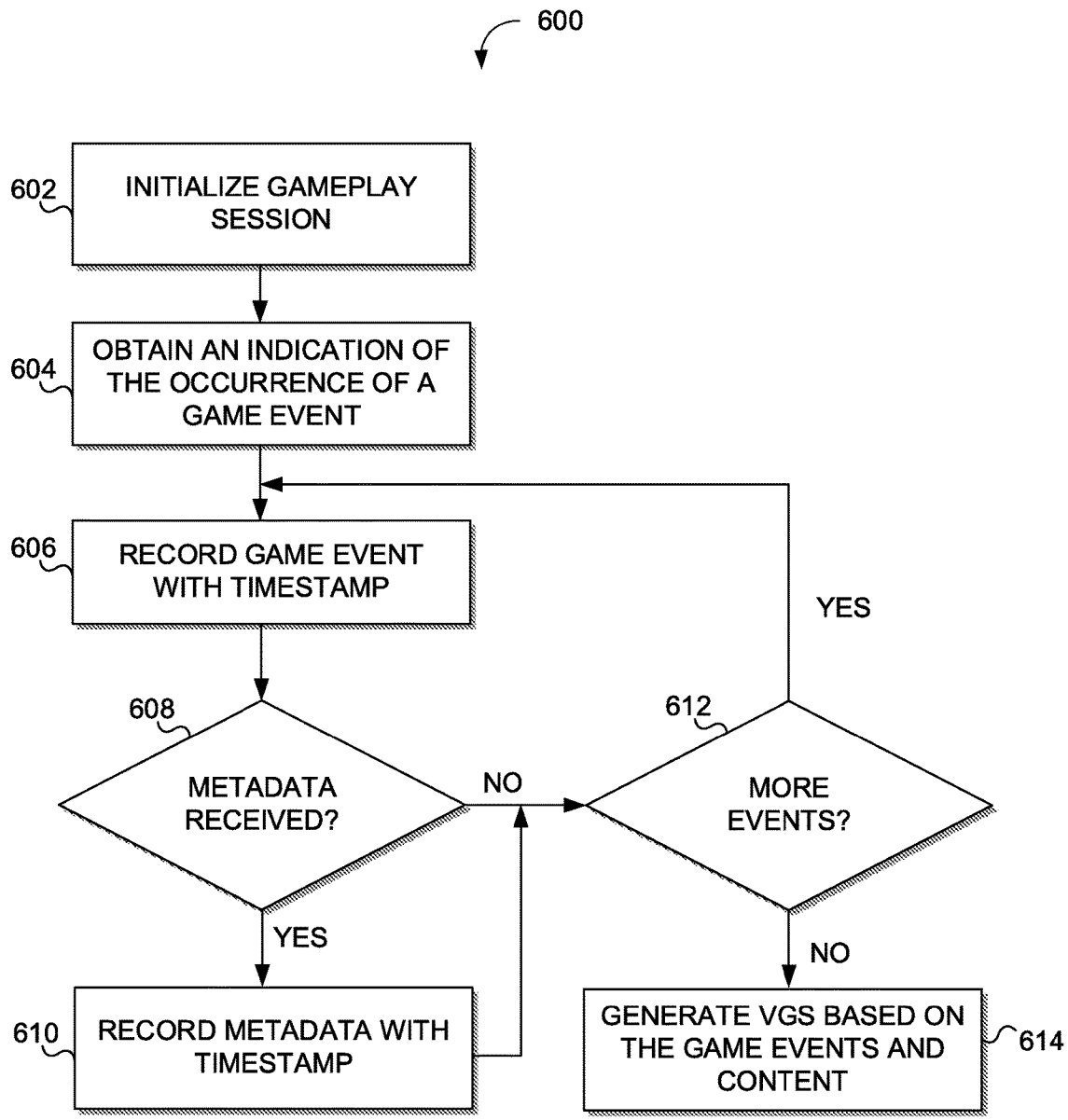
FIG. 6 depicts a process of generating a game log and encoding a video game stream during a gameplay session, according to an implementation of the invention.

FIG. 6 depicts a process 600 of generating a game log and encoding a video game stream during a gameplay session, according to an implementation of the invention.

In an operation 602, process 600 may include initializing a gameplay session of a video game and encoding video game identifying information into a game log. The video game identifying information may include an identification of a video game. Other information may be encoded into the game log as well, such as a time/date of the gameplay session, a number of players, whether the gameplay session is being played over a network connection (and if so, a type of network connection used, an internet service provider used, a quality of network connection), etc.).

In an operation 604, process 600 may include obtaining an indication of a game event.

In an operation 606, process 600 may include recording the game event with a timestamp in the game log.

In an operation 608, process 600 may include determining whether content/metadata related to the game event is received. For instance, content may be related to a game event when the content is received within a predetermined threshold time of the game event.

In an operation 610, process 600 may include recording the metadata with a timestamp in the game log, responsive to a determination that the metadata is related to the game event.

In an operation 612, process 600 may include determining whether another game event is received. If another game event is received, process 600 may return to operation 606. If another game event is not received, process 600 may proceed to an operation 614.

In operation 614, process 600 may include generating a VGS based on the game log and the content related to game events.

Figure 7:
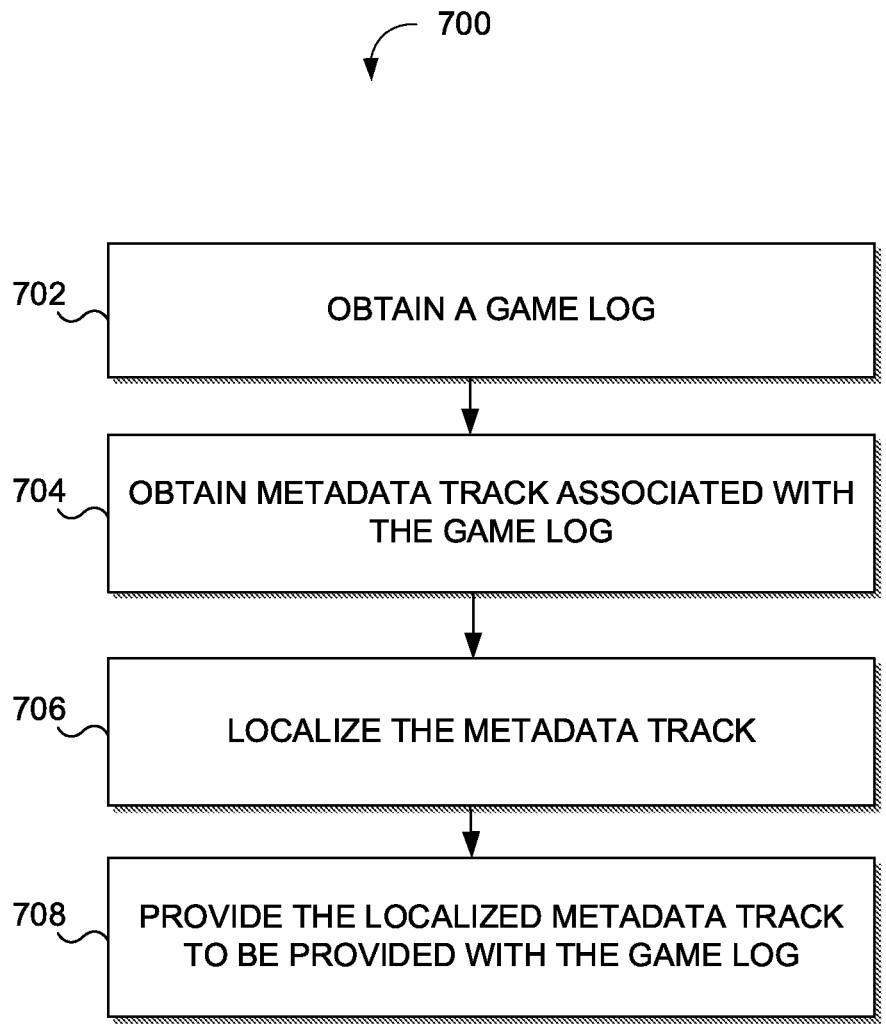
FIG. 7 depicts a process of localizing video game playback, according to an implementation of the invention.

FIG. 7 depicts a process 700 of localizing video game playback, according to an implementation of the invention.

In an operation 702, process 700 may include obtaining a game log. In an operation 704, process 700 may include obtaining a metadata track associated with the game log. The metadata track may include content that can be localized according to a geographic region to which a video game playback will be provided. For instance, the content may be translated into another language.

In an operation 706, process 700 may include localizing the metadata track. For instance, process 700 may include identifying a geographic location to which the video game playback will be provided. Localizing the metadata track may include automatically translating text, spoken utterances, and/or other information included in the metadata track.

In an operation 708, process 700 may include causing the localized metadata track to be provided with the game log.

Figure 8:
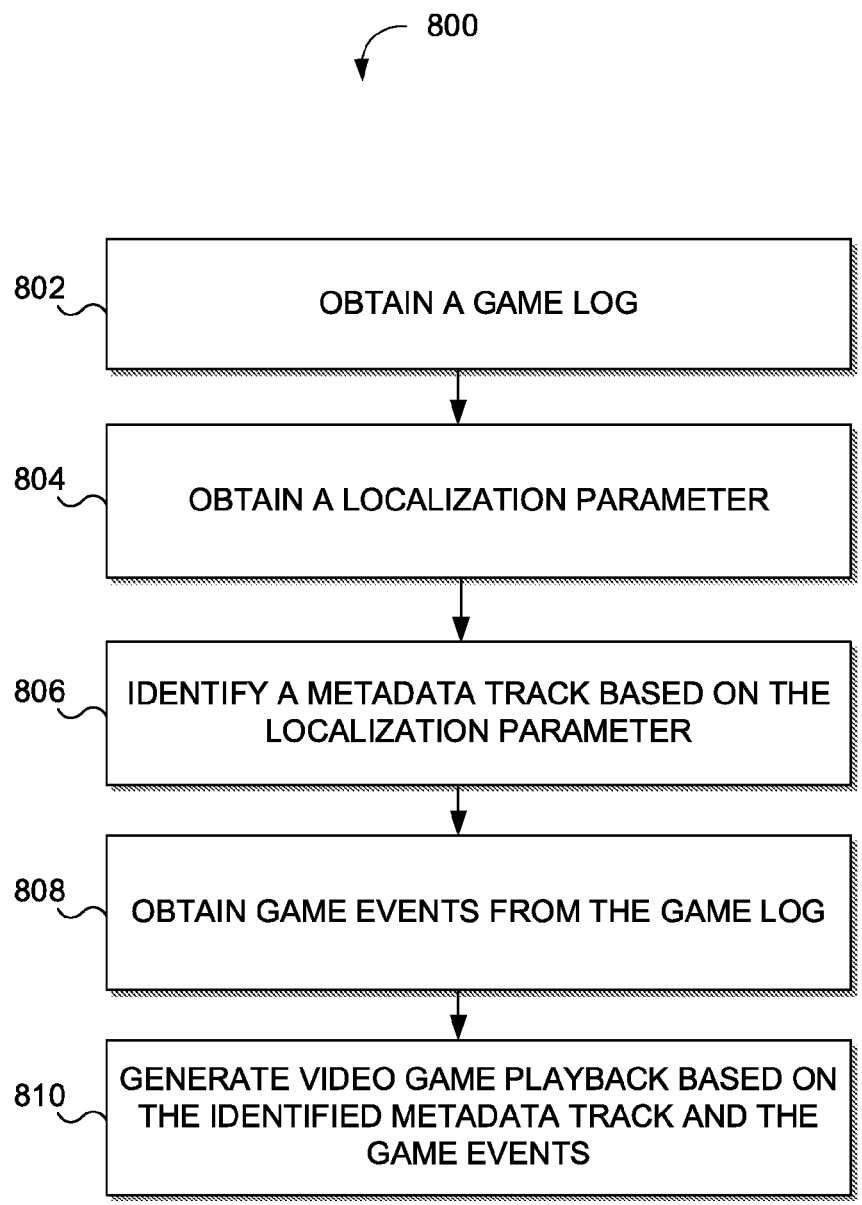
FIG. 8 depicts a process of identifying localization parameters for localizing video game playback, according to an implementation of the invention.

FIG. 8 depicts a process 800 of identifying localization parameters for localizing video game playback, according to an implementation of the invention.

In an operation 802, process 800 may include obtaining a game log. In an operation 804, process 800 may include obtaining a localization parameter. The localization parameter may specify that certain language or other types of content should be used based on a particular locale to which the game log will be provided.

In an operation 806, process 800 may include identifying a metadata track based on the localization parameter and parse content to be included in a video game playback. In an operation 808, process 800 may include obtaining one or more game events from the game log.

In an operation 810, process 800 may include generating the video game playback based on the game events and the content from the metadata track. For instance, process 800 may include identifying a metadata track that is associated with the target geographic location. In a particular example, a first metadata track may include first commentary in a first language and a second metadata track may include second commentary in a second language (which may or may not simply be a human translation of the first commentary). Process 800 may automatically (or responsive to a user query) select the appropriate metadata track.

Figure 9:
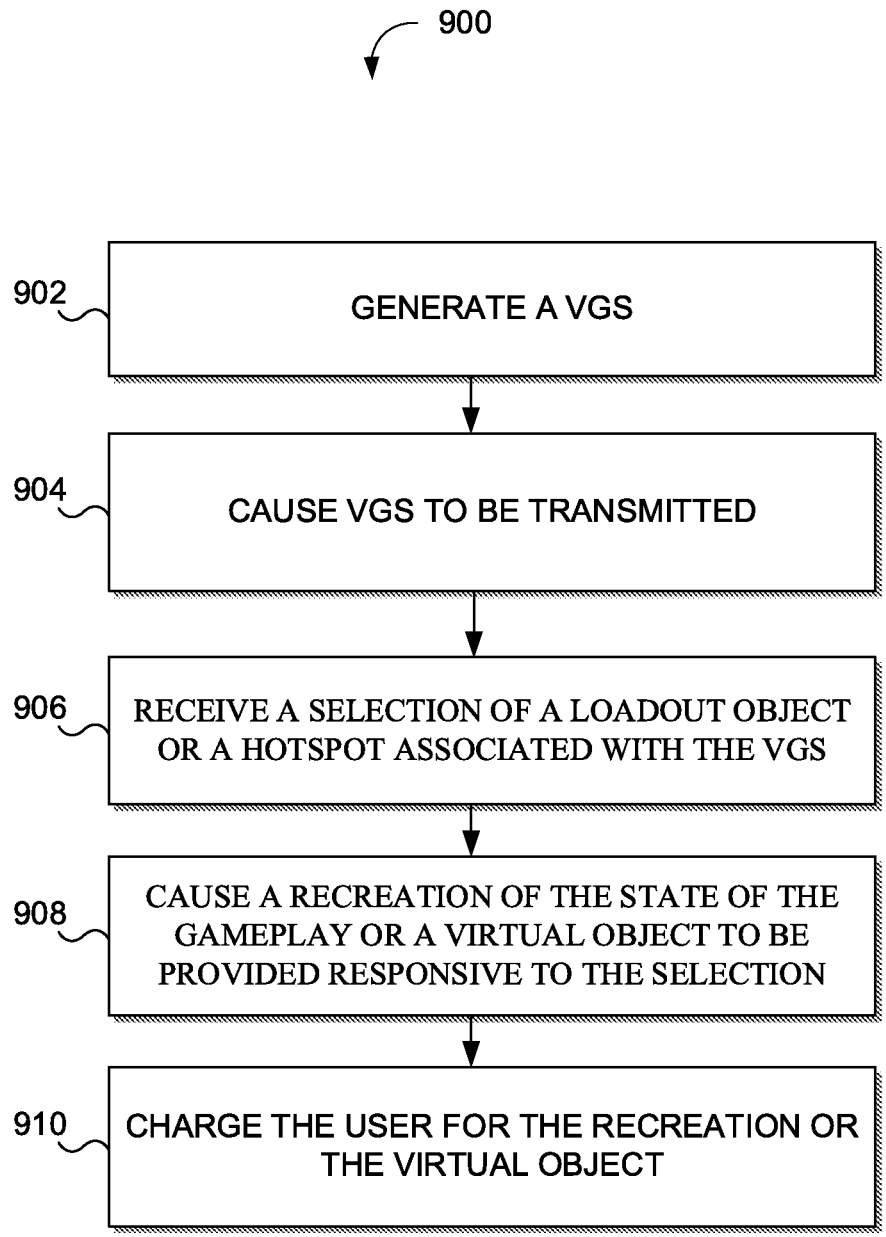
FIG. 9 depicts a process of driving micro-transactions based on video game streams, according to an implementation of the invention.

FIG. 9 depicts a process 900 of driving micro-transactions based on video game streams, according to an implementation of the invention.

In an operation 902, process 900 may include generating a VGS. The VGS may be generated as described herein throughout. In an operation 904, process 900 may include causing the VGS to be transmitted via network 102 to an end user device 140. The VGS may be decoded at the end user device to provide a video game playback of a video game session specified by the VGS.

In an operation 906, process 900 may include receiving, from the end user device, a selection of a loadout object associated with the video game stream or a hotspot associated with the video game stream. The loadout object or the hotspot may be pre-specified as a metadata track in the VGS, or the end user device may generate the loadout object or the hotspot based on a game engine executing at the end user device.

In an operation 908, process 900 may include causing, by the computer, a recreation of the state of the gameplay or the virtual object to be provided responsive to the selection. For instance, if a loadout object was selected, a video game playback associated with the loadout object may be generated or the user associated with the end user device may be provided with an opportunity to play the video game with the loadout conditions or state specified by the loadout object. If a hotspot was selected, a virtual or other object corresponding to the hotspot may be provided to the user for gameplay.

In an operation 910, process 900 may include debiting an account of a user associated with the end user device based on an amount of value relating to the video game playback/recreation or the virtual object. For example, a monetary (real currency value) or perceived/virtual value may be debited from a financial or game account associated with the user.

Other ways of driving micro-transactions and/or using loadouts may be performed as well. For instance, the system may sell load out slots that can be configured with what was depicted by a VGS, charge for or facilitate the creation of loadout objects (which may each be named by a creator, such as "TestSubject-M used in 2015 Nationals"), which may be used to easily swap loadouts in and out for gameplay, charge for or facilitate matchmaking into gameplay sessions that have the same loadout conditions and map as seen in a playback from a VGS, charge for or facilitate social network integration, in which users may share playback or loadouts associated with VGSs (e.g., users may inquire "Have you tried that sniper/shotty loadout "TestSubject-M used in 2015. Nationals"), and/or other ways that will be apparent based on the disclosure herein.

Figure 10:
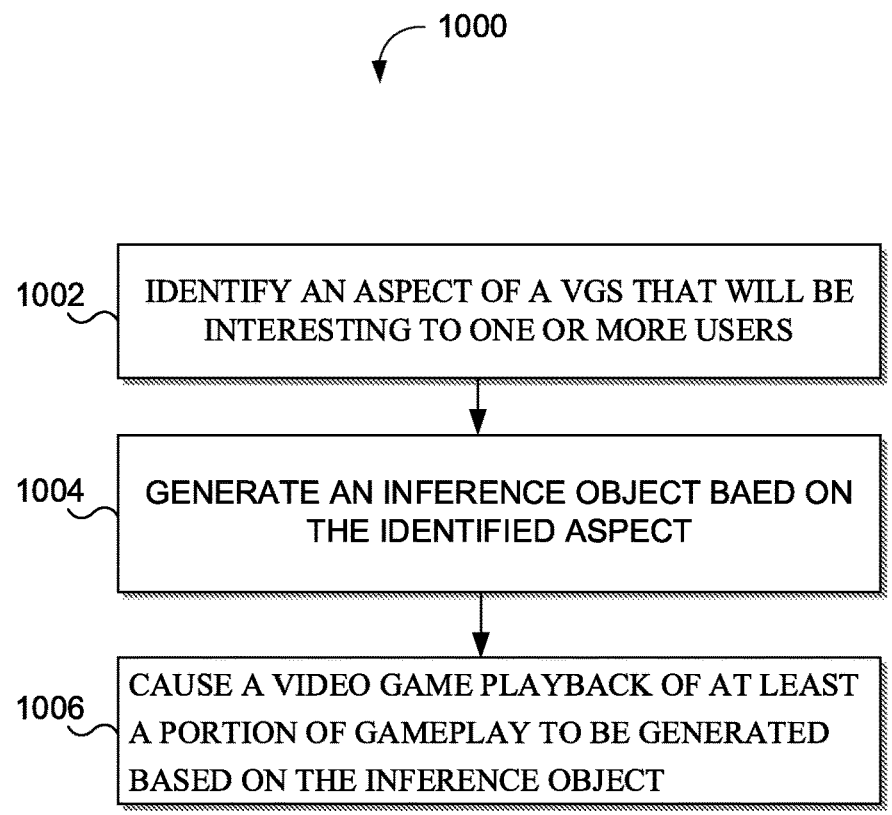
FIG. 10 depicts a process of inferring interest in an aspect of a video game streams, according to an implementation of the invention.

FIG. 10 depicts a process 1000 of inferring interest in an aspect of a video game streams, according to an implementation of the invention.

In an operation 1002, process 1000 may include identifying an aspect of a video game stream that will be interesting to one or more users. An identified aspect may include an entire gameplay session represented by a VGS, a portion of the gameplay session (e.g., a start and end time interval), a particular event in the gameplay session, a particular character or object in the gameplay session, a particular metadata track or portion thereof (e.g., a specific commentary, graphical overlays, etc.), and/or other aspect of a VGS.

In an operation 1004, process 1000 may include generating an inference object based on the identified aspect. An inference object may specify the aspect such that a video game playback relating to the aspect may be generated.

In an operation 1006, process 1000 may include causing a video game playback of at least a portion of the gameplay to be generated based on the inference object. For example, process 1000 may include generating a separate metadata track of inferred objects or may generate a separate VGS based on the inference object. In some instances, process 1000 may generate the video game playback or may simply cause the inference object (or metadata track/VGS generated therefrom) to be transmitted via a network (e.g, network 102).

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented method of generating and providing at least one video game stream for playback of a gameplay of a video game, the method being implemented in a computer having one or more physical processors programmed with computer program instructions that, when executed by the one or more physical processors, cause the computer to perform the method, the method comprising:
   causing, by the computer, a plurality of game logs to be stored in a memory, the plurality of game logs comprising at least a first game log that specifies at least a first event that occurred during the gameplay of the video game to which the first game log relates and information that indicates at least a first time in which the first event occurred during the gameplay;
   causing, by the computer, a plurality of metadata tracks to be stored in the memory, wherein each one of the plurality of metadata tracks is associated with and annotates at least one of the plurality of game logs, wherein the plurality of metadata tracks comprise at least a first metadata track associated with the first game log and a second metadata track associated with the first game log;
   receiving, by the computer, a request to access the at least one video game stream from a user, wherein the request comprises data indicative of the first game log;
   identifying, by the computer, responsive to the request, the first game log and at least one of the first metadata track or the second metadata track to be provided to the user;
   creating, by the computer, the at least one video game stream using the first game log and the at least one of the first metadata track or the second metadata track, wherein the creating of the at least one video game stream is performed dynamically in response to receiving the request to access the at least one video game stream; and
   causing, by the computer, the at least one video game stream to be provided to the user via a network.

2. The method of claim 1, further comprising:
   receiving, at an end user device of the user, the at least one video game stream;
   obtaining, by the end user device, the first game log and at least one of the first metadata track or the second metadata track from the at least one video game stream; and
   generating, by the end user device, the playback of at least a portion of the gameplay based on the first event and at least one of the first metadata track or the second metadata track.

3. The method of claim 2, wherein generating the playback comprises:
   providing, by the end user device, the first game log as an input to a game engine of the video game executing at the end user device, wherein the game engine is configured to generate the playback based on the first game log.

4. The method of claim 1, further comprising:
   obtaining, by the computer, the first game log and the first metadata track during or after completion of the gameplay from a device at which the gameplay occurred.

5. The method of claim 1, further comprising:
   obtaining, by the computer, the first metadata track during or after completion of a playback of the gameplay after the gameplay has occurred.

6. A system for generating and providing at least one video game stream for playback of a gameplay of a video game, the system comprising:
   one or more physical processors programmed with one or more computer program instructions which, when executed, cause the one or more physical processors to:
   store a plurality of game logs in a memory, the plurality of game logs comprising at least a first game log that specifies at least a first event that occurred during the gameplay of the video game to which the first game log relates and information that indicates at least a first time in which the first event occurred during the gameplay;
   store a plurality of metadata tracks in the memory, wherein each one of the plurality of metadata tracks is associated with and annotates at least one of the plurality of game logs, the plurality of metadata tracks including at least a first metadata track associated with the first game log and a second metadata track associated with the first game log;

receive a request to access the at least one video game stream from a user, wherein the request comprises data indicative of the first game log and a metadata track;

identify, responsive to the request, the first game log and at least one of the first metadata track or the second metadata track to be provided to the user;

create the at least one video game stream using the first game log and the at least one of the first metadata track or the second metadata track, wherein the creation of the at least one video game stream is performed dynamically in response to receiving the request to access the at least one video game stream; and provide the at least one video game stream to the user via a network.

7. The system of claim 6, wherein the one or more physical processors are further caused to:

receive, at an end user device of the user, the at least one video game stream;

obtain, by the end user device, the first game log and at least one of the first metadata track or the second metadata track from the at least one video game stream; and generate, by the end user device, the playback of at least a portion of the gameplay based on the first event and at least one of the first metadata track or the second metadata track.

8. The system of claim 7, wherein to generate the playback, the one or more physical processors are further caused to:

provide, by the end user device, the game log as an input to a game engine of the video game executing at the end user device, wherein the game engine is configured to generate the playback based on the game log.

9. The system of claim 6, wherein the one or more physical processors are further caused to:

obtain the first game log and the first metadata track during or after completion of the gameplay from a device at which the gameplay occurred.

10. The system of claim 6, wherein the one or more physical processors are further caused to:

obtain the first metadata track during or after completion of the playback of the gameplay after the gameplay has occurred.

11. A computer program product for generating and providing at least one video game stream for playback of a gameplay of a video game, the computer program product comprising:

one or more tangible, non-transitory computer-readable storage devices;

program instructions, stored on at least one of the one or more tangible, non-transitory computer-readable storage devices that, when executed, cause a computer to:

store a plurality of game logs in a memory, the plurality of game logs comprising at least a first game log that specifies at least a first event that occurred during the gameplay of the video game to which the first game log relates and information that indicates at least a first time in which the first event occurred during the gameplay;

store a plurality of metadata tracks in the memory, wherein each one of the plurality of metadata tracks is associated with and annotates at least one of the plurality of game logs, the plurality of metadata tracks including at least a first metadata track associated with the first game log and a second metadata track associated with the first game log;

receive a request to access the at least one video game stream from a user, wherein the request comprises data indicative of the first game log;

identify, responsive to the request, the first game log and at least one of the first metadata track or the second metadata track to be provided to the user;

create the at least one video game stream using the first game log and the at least one of the first metadata track or the second metadata track, wherein the creation of the at least one video game stream is performed dynamically in response to receiving the request to access the at least one video game stream; and provide the at least one video game stream to the user via a network.

12. The computer program product of claim 11, further comprising program instructions stored on at least one of the one or more tangible, non-transitory computer-readable storage devices that, when executed, cause the computer to:

receive, at an end user device of the user, the at least one video game stream;

obtain, by the end user device, the first game log and at least one of the first metadata track or the second metadata track from the at least one video game stream; and generate, by the end user device, the playback of at least a portion of the gameplay based on the first event and at least one of the first metadata track or the second metadata track.

13. The computer program product of claim 12, wherein to generate the playback, the program instructions, when executed, further cause the computer to:

provide, by the end user device, the first game log as an input to a game engine of the video game executing at the end user device, wherein the game engine is configured to generate the playback based on the first game log.

14. The computer program product of claim 11, wherein to generate the playback, the program instructions, when executed, further cause the computer to:

obtain the first game log and the first metadata track during or after completion of the gameplay from a device at which the gameplay occurred.

15. The computer program product of claim 11, wherein to generate the playback, the program instructions, when executed, further cause the computer to:

obtain the first metadata track during or after completion of the playback of the gameplay after the gameplay has occurred.

* * * * *